(12) United States Patent
Masuzawa et al.

(10) Patent No.: US 7,847,460 B2
(45) Date of Patent: Dec. 7, 2010

(54) YOKE-INTEGRATED BONDED MAGNET AND MAGNET ROTATOR FOR MOTOR USING THE SAME

(75) Inventors: Masahiro Masuzawa, Fukaya (JP); Masahiro Mita, Fukaya (JP); Shigeho Tanigawa, Okegawa (JP); Kyohei Aimuta, Kumagaya (JP)

(73) Assignee: Hitachi Metals, Ltd., Tokyo (JP)

( * ) Notice: Subject to any disclaimer, the term of this patent is extended or adjusted under 35 U.S.C. 154(b) by 295 days.

(21) Appl. No.: 12/280,928

(22) PCT Filed: Feb. 28, 2007

(86) PCT No.: PCT/JP2007/053783

§ 371 (c)(1),
(2), (4) Date: Aug. 27, 2008

(87) PCT Pub. No.: WO2007/102373

PCT Pub. Date: Sep. 13, 2007

(65) Prior Publication Data
US 2009/0085416 A1  Apr. 2, 2009

(30) Foreign Application Priority Data
Mar. 1, 2006  (JP) .................. 2006-054924

(51) Int. Cl.
*H01F 3/08* (2006.01)

(52) U.S. Cl. ............ 310/156.43; 310/44; 148/101

(58) Field of Classification Search ........... 310/44, 310/156.21, 156.43; 148/101; *H01F 3/08*
See application file for complete search history.

(56) References Cited

U.S. PATENT DOCUMENTS

| 4,983,232 | A | * | 1/1991 | Endoh et al. ............. 148/302 |
| 6,031,310 | A | * | 2/2000 | Ishikawa et al. ....... 310/156.21 |
| 6,890,392 | B2 | * | 5/2005 | Kanekiyo et al. ........... 148/101 |
| 6,942,765 | B2 | * | 9/2005 | Griego et al. ............ 204/199 |
| 2006/0255894 | A1 | * | 11/2006 | Enomoto et al. ........... 335/302 |

FOREIGN PATENT DOCUMENTS

| JP | 03-007045 | | 1/1991 |
| JP | 5-326232 | A | 12/1993 |
| JP | 7-169633 | A | 7/1995 |
| JP | 11-186027 | A | 7/1999 |
| JP | 2000-278919 | A | 10/2000 |
| JP | 2001-52921 | A | 2/2001 |

(Continued)

OTHER PUBLICATIONS

Chinese Office Action dated Jun. 4, 2010.

*Primary Examiner*—Quyen Leung
*Assistant Examiner*—Naishadh N Desai
(74) *Attorney, Agent, or Firm*—Sughrue Mion, PLLC

(57) ABSTRACT

This invention provides a soft magnetic yoke-integrated bonded magnet in which a soft magnetic yoke has been integrally compression molded in such a state that the soft magnetic yoke is engaged in a joined face formed by bringing a binding material-containing magnetic powder into contact with a binding material-containing soft magnetic powder. The soft magnetic yoke part and the bonded magnetic part are constructed so that, when the soft magnetic yoke part and the bonded magnet part are compression molded separately from each other, the spring back level is identical upon the release of the compression force.

8 Claims, 15 Drawing Sheets

FOREIGN PATENT DOCUMENTS

| | | |
|---|---|---|
| JP | 2001-95185 A | 4/2001 |
| JP | 2003-32931 A | 1/2003 |
| JP | 2003-319620 A | 11/2003 |
| JP | 2004-140951 A | 5/2004 |
| JP | 2004-248496 A | 9/2004 |
| JP | 2005-20991 A | 1/2005 |
| JP | 2005-347641 A | 12/2005 |

* cited by examiner

| PRE-COMPACTING PRESSURE / COMPACTING PRESSURE | PHOTOGRAPH AT JOINT FACE AFTER SOFT-MAGNETIC YOKE (A) INTEGRALLY MOLDED WITH ISOTROPIC BONDED MAGNET (B) | PHOTOGRAPH AT JOINT FACE AFTER SOFT-MAGNETIC YOKE (A) INTEGRALLY MOLDED WITH ANISOTROPIC BONDED MAGNET (C) |
|---|---|---|
| 200MPa / 600MPa |  ↑ JOINT FACE |  ↑ JOINT FACE |
| 400MPa / 600MPa |  ↑ JOINT FACE |  ↑ JOINT FACE |
| 600MPa / 600MPa |  ↑ JOINT FACE |  ↑ JOINT FACE |

| PRE-COMPACTING PRESSURE / COMPACTING PRESSURE | PHOTOGRAPH AT JOINT FACE AFTER SOFT-MAGNETIC YOKE (A) INTEGRALLY MOLDED WITH ISOTROPIC BONDED MAGNET (B) | PHOTOGRAPH AT JOINT FACE AFTER SOFT-MAGNETIC YOKE (A) INTEGRALLY MOLDED WITH ANISOTROPIC BONDED MAGNET (C) |
|---|---|---|
| 200MPa / 600MPa |  ↑ JOINT FACE |  ↑ JOINT FACE |
| 400MPa / 600MPa |  ↑ JOINT FACE |  ↑ JOINT FACE |
| 600MPa / 600MPa |  ↑ JOINT FACE |  ↑ JOINT FACE |

YOKE-INTEGRATED BONDED MAGNET AND MAGNET ROTATOR FOR MOTOR USING THE SAME

CROSS REFERENCE TO RELATED APPLICATION

This application is a National Stage of International Application No. PCT/JP2007/053783 filed Feb. 28, 2007, claiming priority based on Japanese Patent Application No. 2006-054924, filed Mar. 1, 2006, the contents of all of which are incorporated herein by reference in their entirely.

TECHNICAL FIELD

The present invention relates to a yoke-integrated bonded magnet and a soft-magnetic yoke-integrated bonded magnet rotator for a motor, for increasing the efficiency of and decreasing the weight of the motor, a generator or the like using a permanent magnet.

BACKGROUND ART

Various structures have been devised for magnet rotators for a motor. The rotators are broadly categorized into two groups: one of which is so-called surface permanent magnet (SPM) rotator in which a permanent magnet is arranged on the surface of a magnetic pole, as illustrated in FIGS. 3A to 3C and 3F; and the other of which is an interior permanent magnet (IPM) rotator in which a permanent magnet is arranged inside a rotator, as illustrated in FIGS. 3D and 3E. The former SPM rotator is configured such that the permanent magnet arranged on the surface of the rotator opposes a stator with an air gap therebetween, and has such an advantage that the SPM rotator may be designed and produced more easily than the latter IPM rotator. On the other hand, the latter IPM rotator is superior in constructional reliability and has an advantage in that a high reluctance toque may be easily obtained. An outer magnet rotator illustrated in FIG. 3F has often an SPM structure since a magnet is not liable to be scattered.

In a permanent magnet rotator illustrated in FIGS. 3A to 3F, a permanent magnet is generally bonded to a surface or an inside of a soft-magnetic yoke which is made of an insulating laminate of silicon steel sheets, cast or forged, with use of an adhesive.

The rotation of the magnet rotator incorporated in a motor generates a centrifugal force as the motor rotates, magnetic attraction and repulsive force between the magnet rotator and a stator. In addition, vibration or the like is also generated with the rotation of the motor. Insufficient bonding strength between the magnet and the soft-magnetic yoke detaches and breaks down the magnet. Since a centrifugal force is proportional to nearly the second power of a rotation speed, the higher the rotation speed is, the more serious the problem becomes. This pronouncedly appears in a case of when a segment magnet is used as illustrated in FIGS. 3A to 3F, particularly an inner SPM rotator in which a magnet is arranged on an outer surface of a rotator as shown in FIGS. 3A to 3C. Even when a ring magnet is used, in which a plurality of magnetic poles may be formed by a single magnet, the clearance of an adhesion layer is increased and a softer adhesive is often used in order to prevent the magnet from being broken down due to a difference in linear expansion coefficient between the magnet and the soft-magnetic yoke at the time when temperature of the rotator changes. A clearance of the adhesion layer results in increase in dispersion of adhesion strength, displacement of an adhesion position or the like. In general, the soft adhesive is inferior in thermal stability and adhesive force. As described above, the adhesion for the magnet rotator has many technical problems irrespective of a shape of the magnet.

In view of concern for the above adhesion strength, a structurally reinforcing protective ring 3 made of nonmagnetic stainless steel, a reinforced plastic fiber and the like is wound around an outer periphery of a magnet 101 to increase strength of the inner SPM rotator, as illustrated in FIG. 4. In such a case, however, an effective air gap is extended so that it becomes difficult that a magnetic flux from the magnet reaches the rotator, which leads to lowering an output of the motor. Moreover, the metallic protective ring made of stainless steel and the like generates an eddy current loss to decrease efficiency of the motor. While Patent Documents 1 and 2 disclose comparative examples in which a magnet and a soft-magnetic yoke are integrally formed, it is apparent that they do not have a sufficient bonding strength between the magnet and the soft-magnetic yoke, since it is assumed to use a structurally reinforcing frame or protective ring. It is apparent that a sufficient bonding strength cannot be obtained between the magnet and the soft-magnetic yoke, and the soft-magnetic yoke is held only with an inner pressure of the ring magnet in Patent Documents 3 and 4, from the disclosure of Patent Document 3 that a ring magnet rendered wedge-shaped is wedged into a yoke making use of a macroscopic external shape of the magnet to prevent the ring magnet from being detached from the soft-magnetic yoke, and the disclosure of Patent Document 4 that a magnet is limited to a ring shaped one and a production method thereof. Patent Document 5 discloses that pre-compacting and compacting steps are performed to mold a ring shaped magnet. A ring shaped magnet is, however, joined to a soft-magnetic yoke by an adhesive, which is insufficient in bonding strength and reliability.

Patent Document 6 discloses that a bonded magnet powder and a soft-magnetic powder are integrally compression molded without using an adhesive, so that a sufficient mechanical strength is obtained as a rotator. In particular, an IPM rotator is integrally molded while preventing a crack due to residual stress generated by a difference of spring back between the bonded magnet powder and those of soft-magnetic powder, within a range of the shape described in Patent Document 6. However, a noticeable crack often appears in the soft-magnetic yoke in a case where the rotator is out of the shape defined in Patent Document 6 or where a radial thickness of the soft-magnetic yoke part is smaller than the magnet part. The crack significantly decreases the mechanical strength of a compact and is not preferable for a rotator for a motor. As a demand for improving efficiency of a motor increases and for reducing its weight, a magnet rotator tends to be more complicated in structure and smaller in thickness. Thus, such a shape is demanded, which is difficult to be integral molding unless residual stress generated in the vicinity of a joint face and a difference of spring back of particles itself between the bonded magnet powder and the soft-magnetic powder are reduced.

Patent Document 1: JP-A-2001-95185

Patent Document 2: JP-A-2003-32931

Patent Document 3: JP-A-05-326232

Patent Document 4: JP-A-07-169633

Patent Document 5: JP-A-2001-052921
Patent Document 6: JP-A-2005-20991

SUMMARY OF THE INVENTION

The present invention has been made in view of the above problems, and its object is to reduce residual stress generated in the vicinity of a joint face due to a difference of the amount of spring back of powder particles itself between different materials even if a bonded magnet part and soft-magnetic yoke part have complicated shapes or smaller thicknesses, so as to avoid a crack, and to provide a yoke-integrated bonded magnet and a soft-magnetic yoke-integrated bonded magnet rotator of a surface-permanent-magnet type or inner-magnet type, which has high safety in strength for applications demanding a high speed operation by avoiding the appearance of the crack.

The present invention provides a soft-magnetic yoke-integrated bonded magnet including a soft-magnetic yoke part and a bonded magnet part. A magnet powder containing a binding material and a soft-magnetic powder containing a binding material are integrally compression molded while engaging with each other at a joint face where both powders are in contact with each other. The soft-magnetic yoke part and the bonded magnet part are configured such that, in a case where the soft-magnetic yoke part and the bonded magnet part were separately compression molded, an amount of spring back is equalized therebetween after compressive force is released.

According to the present invention, the residual stress of the soft-magnetic yoke part and the bonded magnet part of the integrally compression molded soft-magnetic yoke-integrated bonded magnet may be decreased. Particularly, tensile stress of the soft-magnetic yoke part may be decreased. Thereby, the crack may be prevented. Thus, a rotator is integrally molded with the bonded magnet powder and the soft-magnetic powder containing the binding material, such as a resin binder, and is provided a magnet rotator having high adhesion strength between the bonded magnet part and the soft-magnetic yoke part and structural reliability for applications demanding a high speed operation. Since residual stress in the vicinity of the joint face due to a difference of spring back of powder particles between the bonded magnet powder and the soft-magnetic yoke powder may be reduced, there is be provided a magnet rotator which is crack-free and rigid even if a bonded magnet part and soft-magnetic yoke part have complicated shapes or smaller thicknesses.

DETAILED DESCRIPTION OF THE INVENTION

The present invention provides a soft-magnetic yoke-integrated bonded magnet including a bonded magnet part and a soft-magnetic yoke part. The approach is to reduce residual stress caused by a difference in spring back between powder particles in the vicinity of a joint face where the bonded magnet part and the soft-magnetic yoke part are in contact with each other.

A first embodiment of the present invention provides a soft-magnetic yoke-integrated bonded magnet in which a magnet powder containing a binding material and a soft-magnetic powder containing the binding material are integrally compression molded while engaging with each other at a joint face where both powders are in contact with each other, wherein the mass of the soft-magnetic yoke is greater by 1% to 20% by mass than a reference value, the reference value being defined such that, in case where the soft-magnetic yoke part and bonded magnet part having the reference values are were separately compression molded, they are in the same thickness in the pressurized direction.

An atomized iron powder may be used as the soft-magnetic powder. In that case, iron yoke-integrated bonded magnet may be obtained in which the soft-magnetic yoke part is an iron yoke part.

An isotropy and/or anisotropy bonded magnet may be used for the magnet part. Irrespective of isotropy or anisotropy, an R—Fe—B bonded magnet excellent in magnetic property and containing a moderate amount of binding material has an amount of spring back of powder itself about 0.3% to 0.4% of the dimension of a compact body to which a molding pressure is applied. The term "spring back" is defined as a phenomenon that a compact body released from a compacting pressure expands in all directions in relation to the dimension of a die of a mold. An amount of the expansion is referred to as an amount of spring back. On the other hand, an atomized iron powder is of comparatively lower price than other soft magnetic powder and good in availability, and a compound of the atomized iron powder containing a moderate amount of a binding material has an amount of spring back about 0.1% to about 0.2%. For this reason, when a compound of bonded magnet powder and atomized iron powder is compacted together, tensile stress is caused in the vicinity of a joint interface on the side of the iron yoke having relatively small spring back. Distribution or absolute value of the stress varies depending on a relative shape and a volume ratio between the bonded magnet and the iron yoke. When residual stress exceeds allowable stress, a crack generates. In general, since a compact body has strong compressive stress and weak in tensile stress, a crack caused by a difference of the amounts of spring back is apt to generate on the side of the iron yoke having comparatively small spring back.

Figure 1A:
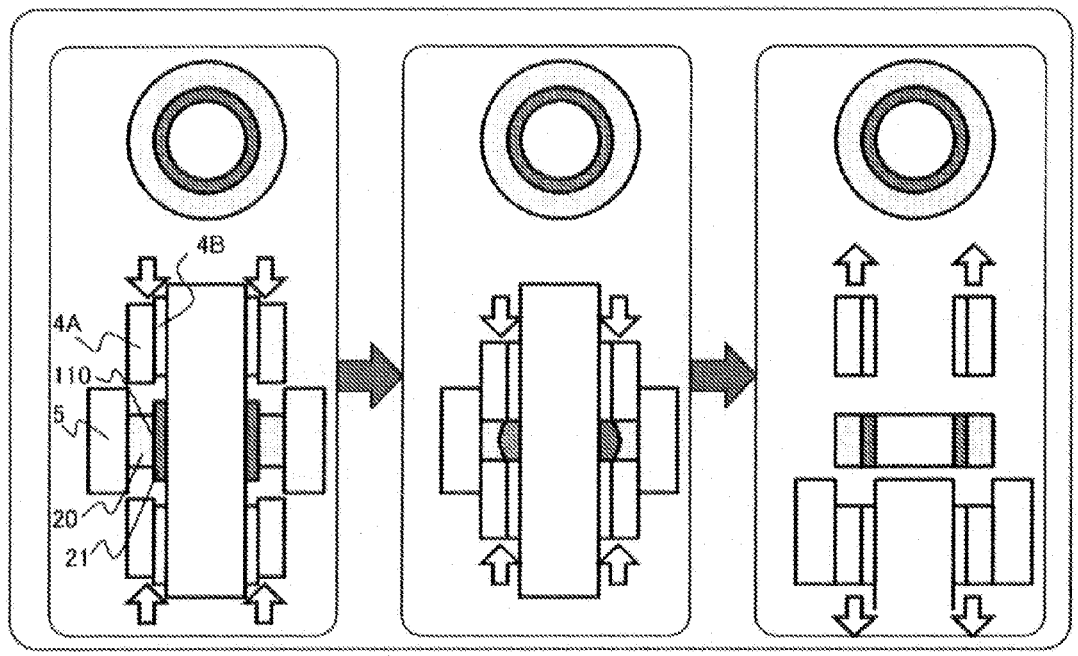
FIG. 1A is a schematic diagram illustrating a production method of integrally molding a bonded magnet and an iron yoke according to an example of the present invention, and the diagram also illustrating a top view (upper figure) and a side view (lower figure) of pre-compact assembly, integral molding, and decompression, from left to right.
Figure 1B:
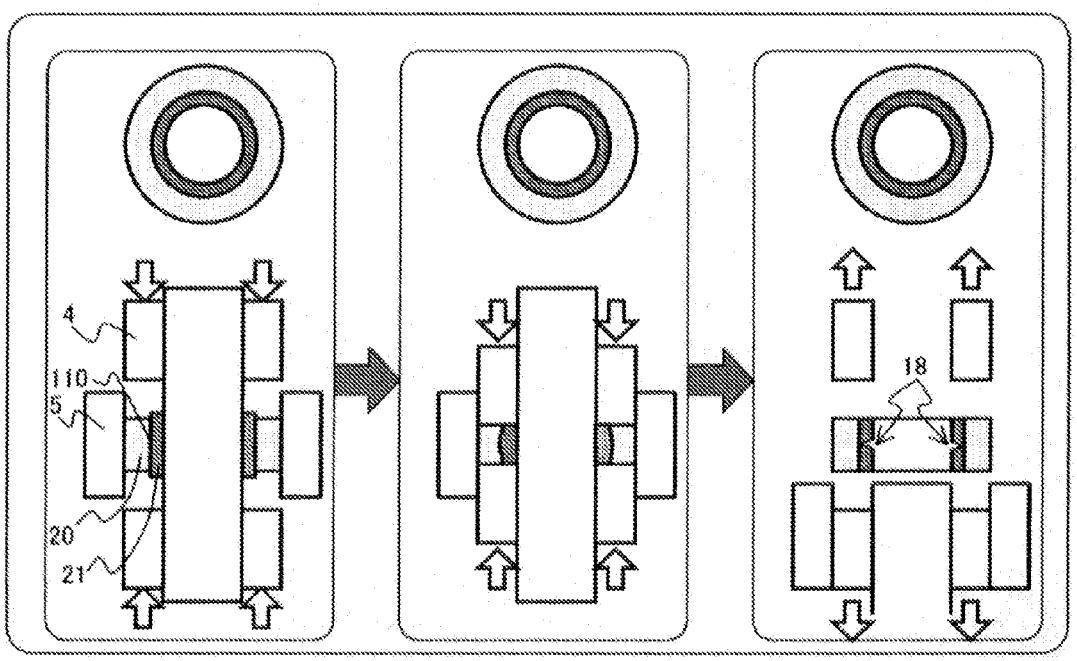
FIG. 1B is a schematic diagram illustrating a production method of integrally molding a conventional bonded magnet and an iron yoke, and the diagram also illustrating a top view (upper figure) and a side view (lower figure) of pre-compact assembly, integral molding and decompression, from left to right.
Figure 2A:
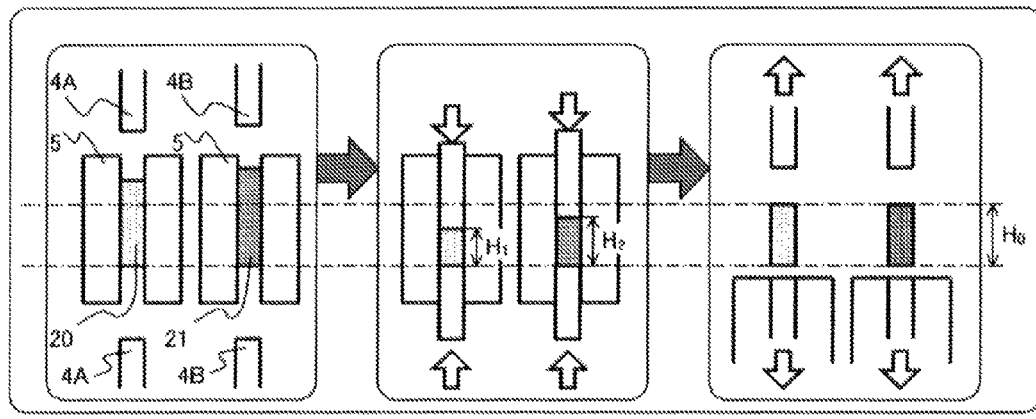
FIG. 2A is a schematic diagram illustrating a production method of separately compacting a conventional bonded magnet and an iron yoke as a comparative example, and the diagram also illustrating side views before compacting, during compacting and after compacting, from the left to right.
Figure 2B:
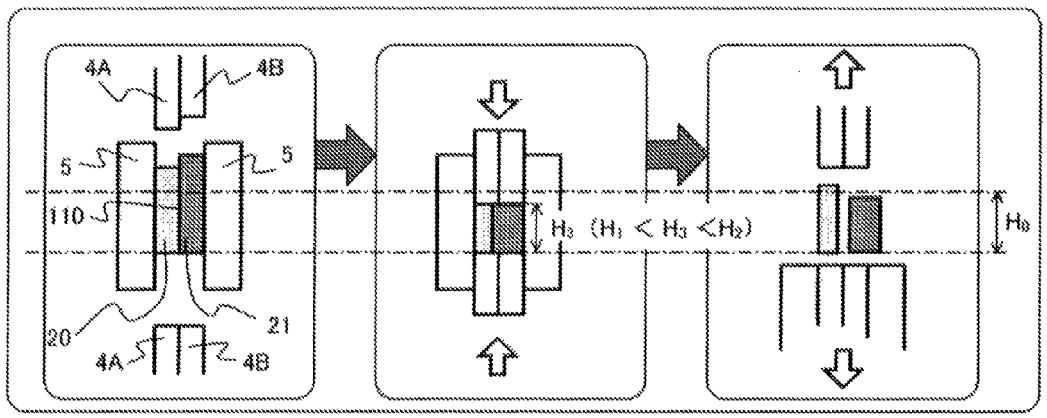
FIG. 2B is a schematic diagram illustrating a production method on the assumption that a conventional bonded magnet is not joined with a conventional iron yoke, as a comparative example, and the diagram also illustrating side views before compacting, during compacting and after compacting, from the left to right.
Figure 2C:
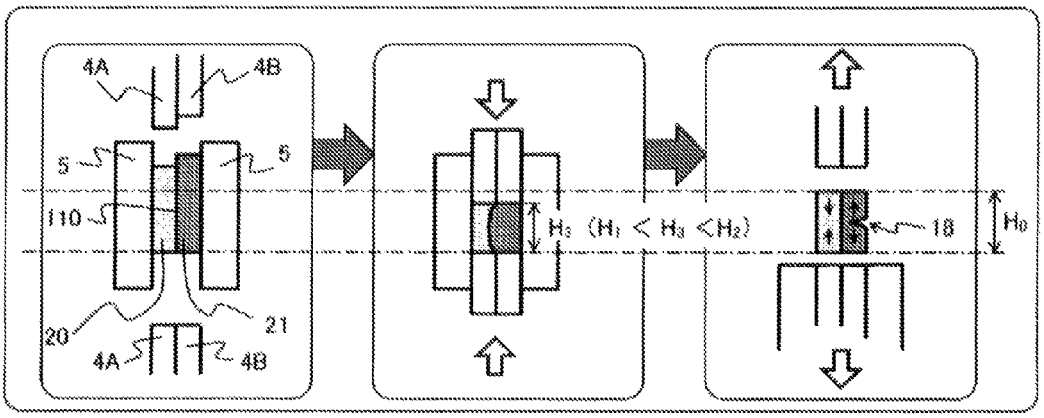
FIG. 2C is a schematic diagram illustrating a production method on the assumption that a conventional bonded magnet is not joined with a conventional iron yoke by integral molding, as a comparative example, and the diagram also illustrating side views before compacting, during compacting and after compacting, from the left to right.
Figure 3A:
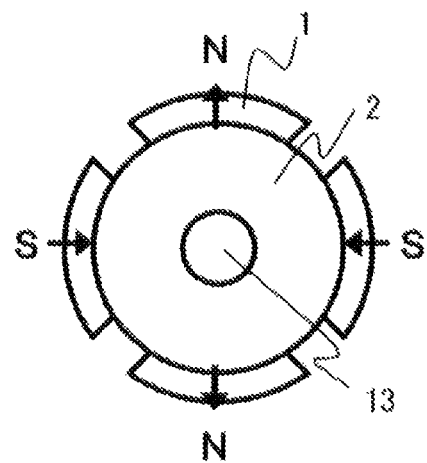
FIG. 3A is a schematic cross section describing an example of the system of a conventional surface permanent magnet rotator, where reference numeral 1 denotes a bonded magnet part; reference numeral 2 denotes a soft-magnetic part; and reference numeral 13 denotes a shaft (motor rotating shaft)
Figure 3B:
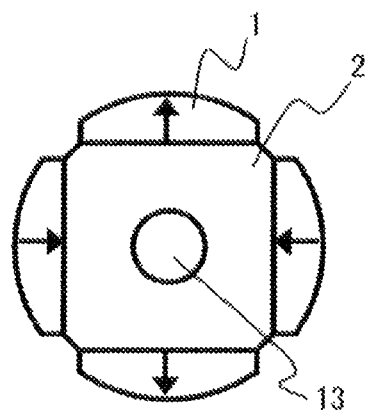
FIG. 3B is a schematic cross section describing an example of the system of a conventional surface permanent magnet rotator.
Figure 3C:
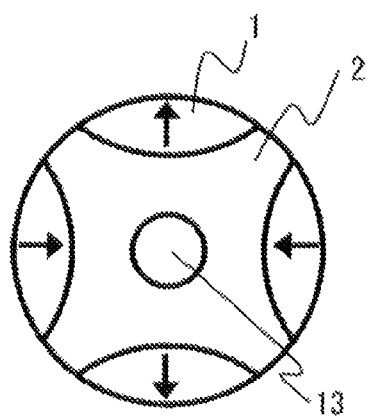
FIG. 3C is a schematic cross section describing an example of the system of a conventional surface permanent magnet rotator.
Figure 3D:
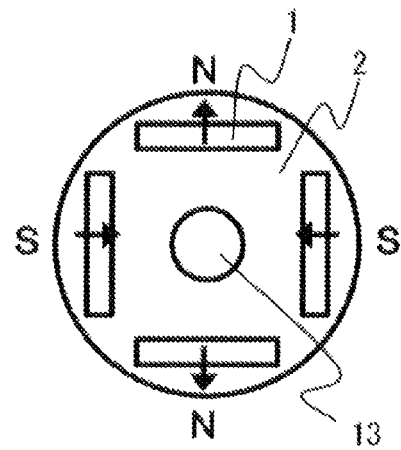
FIG. 3D is a schematic cross section describing an example of the system of a conventional interior permanent magnet rotator.
Figure 3E:
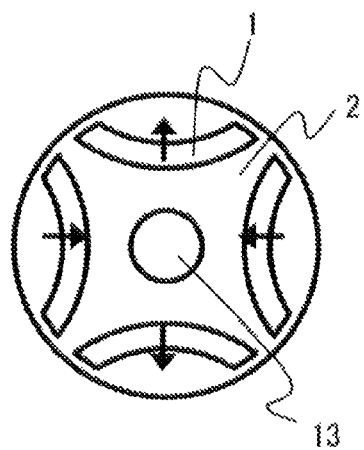
FIG. 3E is a schematic cross section describing an example of the system of a conventional interior permanent magnet rotator.
Figure 3F:
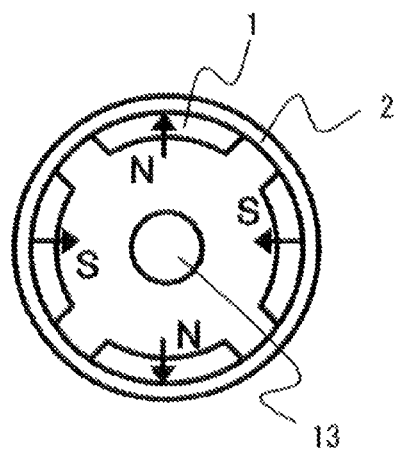
FIG. 3F is a schematic cross section describing an example of the system of a conventional surface permanent magnet rotator.
Figure 4:
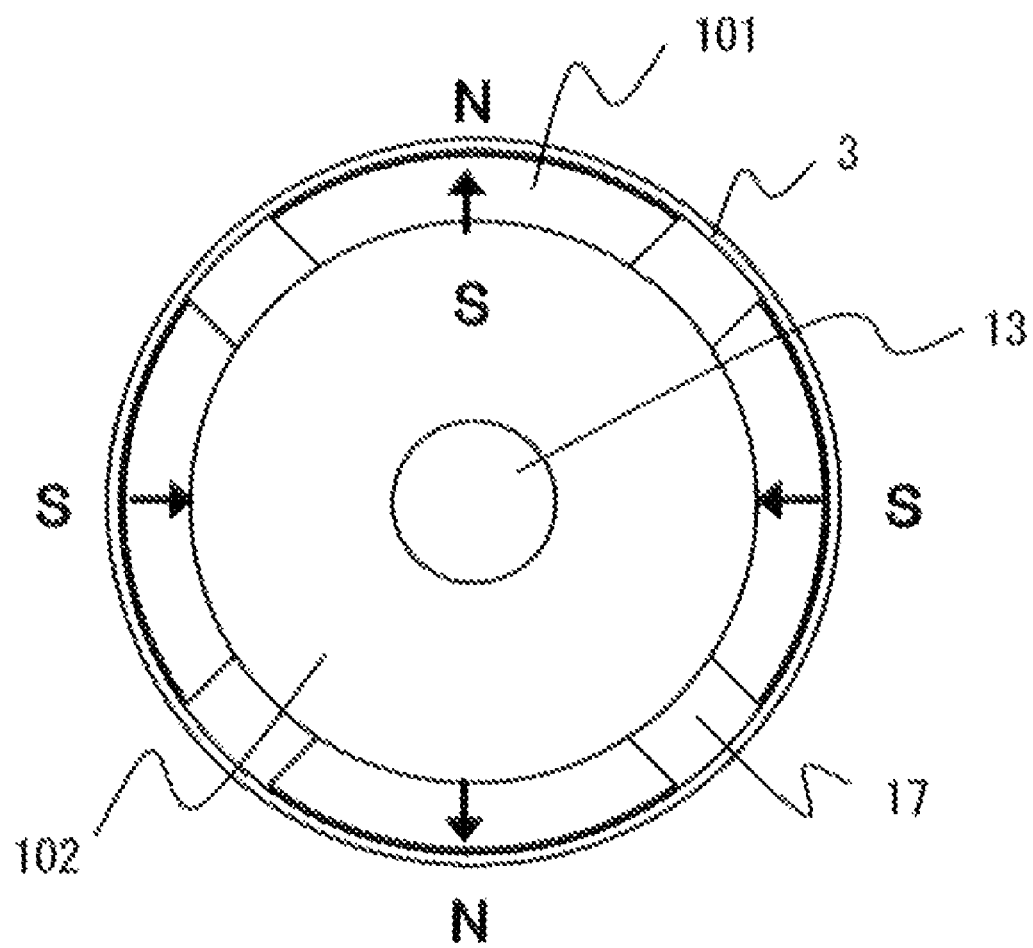
FIG. 4 is a schematic cross section of a surface-permanent-magnet permanent magnet rotator of a comparative example, where reference numeral 3 denotes a protective ring; reference numeral 101 denotes a segment magnet; reference numeral 102 denotes a soft-magnetic yoke; reference numeral 17 denotes air gap; and reference numeral 13 denotes a shaft.

An integral molding is described in detail below, in which powder is not supplied to adjust, with reference to comparative examples in FIGS. 1B and 2A to 2C. FIG. 1B is a schematic diagram of an integral molding in the case where both bonded magnet and iron yoke are annular. FIGS. 2A to 2C are schematic diagrams showing a joint interface at the time of the integral molding. Reference values of the bonded magnet and the iron yoke are defined as the amounts of powders supplied per unit area in the case where the bonded magnet and the iron yoke have a same thickness $H_0$ in the pressure direction of the compact body including the amount of expansion due to spring back when they are separately compacted under the same pressure of 500 to 1000 MPa and then decompressed as illustrated in the comparative example in FIG. 2A. The above compressive molding pressure is rendered equal to an after-mentioned compacting pressure. The term "decompress" means to release the compact body from pressure.

As described above, the amount of spring back of the bonded magnet powder is larger than that of the atomized iron powder, so that the thickness $H_1$ of the bonded magnet under pressure is smaller than that $H_2$ Of the iron yoke ($H_1 < H_2$). On the other hand, as illustrated in the comparative examples in FIGS. 2B and 2C, when a pre-compact body 20 of the bonded magnet having the amount of powder supplied equal to the reference value and an pre-compact body 21 of the iron yoke having the amount of powder supplied equal to the reference value are integrated and compacted, the thickness $H_3$ under pressure substantially equals to an average of $H_1$ and $H_2$, so that the following relationship is established ($H_1 < H_3 < H_2$). In other words, when the bonded magnet and the iron yoke are compacted integrally with respective reference values, compressive force deviates to the side of the iron yoke and the iron yoke is excessively pressed. However, as is obvious from the difference in the amount of spring back, the bonded magnet has greater elastic modulus of a compact body than the iron yoke. The iron yoke excessively pressed at the time of compacting presses sideways the bonded magnet having greater elastic modulus. Thus, as pressure force is generated on the joint face, a sufficient compressive force is transmitted to the bonded magnet. However, the pressure is thus differently transmitted to the bonded magnet part and the iron yoke part at the time of compacting. As illustrated in the comparative example in FIG. 2B, if it is assumed that the bonded magnet is not joined to and the iron yoke, for example, the bonded magnet extends and the iron yoke shrinks in relation to a target thickness $H_0$.

For this reason, as illustrated in the comparative example in FIG. 2C, integrally molding of the bonded magnet and the iron yoke with respective reference values causes tensile stress in the iron yoke. Similarly to the above, the integral molding of the annular magnet rotator is described in detail with reference to the comparative example in FIG. 1B. A pre-compacting pressure is taken to be a low pressure of 200 MPa to 400 MPa and a compacting pressure is taken to be a high pressure of 500 MPa to 1000 MPa. A compact body 20 of the bonded-magnet and a compact body 21 of the iron yoke are separately produced and arranged inside a mold 5. A compacting punch 4 has the same cross section as a combination of the pre-compact bodies 20 and 21. The upper and the lower punches 4, 4 are moved to advance to compress the pre-compact bodies 20 and 21 together and integrate them. The pressure at this time uses the foregoing compacting pressure. Since both pre-compact bodies 20 and 21 have the amount of powder supplied equal to respective reference values, the joint face between both pre-compact bodies maintains a cylindrical geometry. When the compact bodies reach a predetermined dimension, they are decompressed. Decompression causes the compact bodies to slightly extend not only in the radial direction but also in the compressive direction due to the spring back phenomenon. Since the compact body 20 of the bonded-magnet extends more than the compact body 21 of the iron yoke, compressive stress remains in the compact body 20 which is inhibited to extend in the compressive direction, and tensile stress remains in the compact body 21 as internal stress. As described above, since a compact body is weak in tensile stress, molding crack 18 is apt to generate in the circumferential direction in the vicinity of the center, particularly on the side of inner diameter of the iron yoke, and in the pressure direction in which density is the hardest to increase.

In order to prevent the crack, tensile residual stress is required to be reduced mainly in the iron yoke. Then, as illustrated in an example in FIG. 1A, the amount of the atomized iron powder supplied was designed to be relatively increased. That is to say, only the amount of the supplied atomized iron powder forming the iron yoke part was increased with respect to the reference value. FIG. 1A illustrates the example in which the compact body 20 of the bonded magnet having an amount of powder supplied equal to the reference value and the compact body 21 of the iron yoke having an amount of powder supplied more than the reference value by 1% to 20% by mass are combined to be integrated at the same time by compacting. A pre-compacting pressure is taken to be 200 MPa to 400 MPa and a compacting pressure is taken to be 500 MPa to 1000 MPa. A compacting punch 4A of the bonded magnet is moved independently from a forming punch 4B of the iron yoke to be controllable independently from each other. The punches 4A and 4A are advanced beforehand to block a mold cavity on the side of the bonded magnet so that the compact body does not collapse at the time of compacting of the iron yoke pre-compact body 21 which is projected at the both ends thereof than the bonded magnet pre-compact body 20. Under this condition, the upper and the lower punches 4B and 4B are caused to advance to compress the iron yoke pre-compact body 21. When the iron yoke pre-compact body 21 is compressed to such an extent that the iron yoke pre-compact body 21 is substantially equal in height to the bonded magnet pre-compact body 20, the punches 4A and 4B are integrally controlled to apply the compacting pressure to the compact body to further compress them. Since the iron yoke pre-compact body 21 contains the atomized iron powder more than the reference value, when the iron yoke pre-compact body 21 and the bonded magnet pre-compact body 20 containing magnet powder in amount of the reference value are compressed at the same time in contact with each together, the joint face between both compact bodies is protruded toward the pre-compact body 20. When the compact body reaches a predetermined dimension, it is decompressed. After decompression, the punches 4A and 4B are retreated and the compact body is taken out of the mold 5. The decompression causes the compact body to expand in all directions due to the spring back phenomenon and resolves the protrusion on the joint face. Thus, the integral molding does not cause a crack in the compact body.

The reason why a crack is not generated in the compact body is described below. In the example in FIG. 1A, since the iron yoke has an amount of powder supplied more than the reference value, it expands in the direction orthogonal to compression at the time of the integral molding so as to press the bonded magnet. This enables dispersing a compressive force, which would, otherwise, deviate to the iron yoke owing to a difference of the amounts of powder supplied, to the side of the bonded magnet so as to equalize the compressive force of the bonded magnet to that of the iron yoke. A large frictional force is generated on the contact surface between the upper and lower punches and the compact body, and it prevents the bonded magnet and the iron yoke from being deformed. For this reason, the center of the iron yoke in the pressure direction is slightly protruded under compression. Under this condition, when the upper and the lower punches are caused to decompress and the compact body is pulled out of the mold 5, the protrusion on the joint face is removed as to absorb the difference of spring back between the bonded magnet and the iron yoke. Thereby, residual stress in the vicinity of the joint face between the bonded magnet and the iron yoke is reduced and the compact body hardly suffers from a crack. The amount of the atomized iron powder to be supplied is preferably increased within the range of 1% to 20% by mass with respect to the reference value. The amount is preferably adjusted according to the ratio in cross section perpendicular to the pressure direction between the bonded magnet and the iron yoke. When an increase in atomized iron powder with respect to the reference value is less than 1% by mass, a pronounced effect cannot be achieved in the suppression of a crack. When an increase in atomized iron powder is more than 20% by mass, compressive force excessively deflects to the iron yoke to break down the compact body, deform the compact body or decrease the density of the bonded magnet.

A second embodiment of the present invention provides a method of reducing residual stress generated in the vicinity of the joint face such that Young's modulus is controlled to level the amount of spring back of the soft-magnetic (iron) yoke part with that of the bonded magnet part, instead of the method of increasing the amount of soft-magnet powder (or, atomized iron powder) to be supplied with respect to the reference value, such as adopted in the first embodiment. The amount of spring back of a compact body intimately has a relation to hardness of the material powder. The harder the material powder is, the larger the amount of spring back of the compact body is. In practice, the bonded magnet powder is obtained by rapid-quenching, such as melt spinning or strip casting, to produce hard alloy with improved magnetic properties, and then grinding and heat-treating of the alloy. Vickers hardness Hv (JIS-B7725) of the powder before compression molding is approximately 200, while Hv of the atomized iron powder is approximately 100, half of the former. In proportion to the above, the amount of spring back in the compact body of the bonded magnet powder is at least twice as large as that in the atomized iron powder. Since the average particle diameter of the bonded magnet powder is as small as about 100 µm and that of the atomized iron powder is as small as about 30 µm, the Vickers hardness of the powder was measured using a micro Vickers tester under a test load of 10 grams. Thus, it is possible to measure the hardness of the powder. However, it is extremely difficult to determine the hardness of material powder from the compact body after compression molding. Furthermore, since the term "spring back" indicates an amount of expansion of the compact body with respect to die dimensions of the mold, the amount of spring back cannot be determined if the die dimensions are unclear. As one of parameters representing hardness of a material, Young's modulus has been known. Young's modulus corresponds to gradient in a linear region of stress to strain. The higher the value is, the harder the material is. The Young's modulus of the compact body after thermosetting treatment may be comparatively easily measured, using a strain gauge, from correlation between an applied load to the compact body and a displacement thereof. Consequently, the second embodiment of the present invention may be defined with use of Young's modulus of the compact body.

The second embodiment of the present invention provides a soft-magnetic yoke-integrated bonded magnet. A magnet powder containing a binding material and a soft-magnetic powder containing a binding material are integrally compression molded while engaging with each other at a joint face where both powders are in contact with each other. Young's modulus of a soft-magnetic yoke part subjected to thermosetting treatment is 100% to 120% of that of a bonded magnet part. Also in this embodiment, the mass of the soft-magnetic yoke is preferably larger by not more than 10% by mass than a reference value which is determined so as to level thicknesses of the soft-magnetic yoke part and the bonded magnet part in the pressurized direction in the case where they were separately compression molded. The "soft-magnetic yoke" means that it may contain any alloy elements except pure iron or any additives except binding material in the atomized iron powder.

The reason why Young's modulus of the soft-magnetic yoke part subjected to thermosetting treatment is limited to 100% to 120% of that of the bonded magnet part is described below. Young's modulus of the bonded magnet compact body after the thermosetting-treatment is approximately 500 MPa in case where it is an R—Fe—B bonded magnet powder excellent in magnetic property and containing a moderate amount of binding material. On the other hand, Young's modulus of the iron yoke compact body after thermosetting-treatment is approximately 800 MPa, in case where it is made of atomized iron powder containing a moderate amount of binding material, which is approximately 160% of that of the bonded magnet. Young's modulus of the compression-molded iron yoke compact body is larger than that of the bonded magnet while the hardness of the atomized iron powder is lower than that of the bonded magnet powder. It is because the atomized iron powder is plastic deformed at the time of compression molding since the atomized iron powder is pliable so as to decrease holes, and the density of the compact body is increase by approximately 10% than that in the bonded magnet. Increase in density of the compact body depends also on a particle shape and a distribution of a particle size of the material powder. Young's modulus of the compact body after heat-treatment is influenced by various factors, so that it is extremely difficult to cause Young's modulus of compact bodies made of different material powders to completely coincide with each other at the time of integral molding. For this reason, a tolerance for a difference in spring back is preferably established within the range in which no crack is caused in the compact body. Specifically, when the difference in Young's modulus between the atomized iron powder and the bonded magnet powder after the compression-molding and thermosetting-treatment is decreased from 60%, which is a current difference and at which a crack is liable to be caused, to ⅓ thereof, residual stress does not exceed an allowable stress and a crack is not caused. Accordingly, Young's modulus of the thermosetting-treated soft-magnet yoke part is preferably limited to 100% to 120% of that of the bonded magnet.

The reason why the increase in the soft-magnetic powder is limited to the range of not more than 10% by mass of the reference value is described below. If the amounts of spring back of the bonded magnet powder and the soft-magnetic powder are caused to coincide with each other, it is not required to adjust the supply of powder. As described above, however, the amount of spring back is influenced by various factors and the adjustment of the supply of powder influences the magnetic properties and mechanical strength of the compact body. Even if material powder having an adjusted spring back is used, an adjustment margin of not more than 10% by mass is preferably provided for the increase in the soft-magnetic powder in consideration of various characteristics of a magnet rotator for a motor. The reason why the upper limit of the adjustment margin is rendered to be 10% by mass is because Young's modulus of the soft-magnetic yoke part subjected to thermosetting treatment is limited to 100% to 120% of that of the bonded magnet part to inevitably increase the hardness of the soft-magnetic powder, to enable the adjustment margin to be reduced to a half of that of the case where a conventional atomized iron powder is used. The reason why the adjustment margin is halved is described below. As described above, the Vickers hardness of the atomized iron powder is approximately half of the bonded magnet powder which has comparatively larger spring back of the compact body. On the other hand, when any additives except pure iron are mixed or reacted to the atomized iron powder substantially to doubles the entire or average hardness of the soft-magnetic powder, the compactibility of powder is degraded significantly, so that the soft-magnetic properties and mechanical strength are sharply reduced. In order to avoid that, preferably, the hardness of the soft-magnetic powder is limited to not more than 1.5 times as large as that of the bonded magnet powder and shortage of the amount of spring back is compensated by increase in density of the compact body. To realize that, the increase in the soft-magnetic powder is required to be 10% at maximum. For this reason, the increase in the soft-magnetic powder is preferably rendered to be not more than 10% by mass of the reference value.

In general, the atomized iron powder refers to pure iron powder produced by spraying high pressure gas or water flow to a molten metal or alloy flown through a pore and by subjecting the produced powder to decarbonizing reduction treatment. The atomized iron powder hardly contains pores therein and is excellent in fluidity because of its smooth surface and spherical shape and is excellent in compressibility. Thus, the atomized iron powder is pure metal produced by a simple production process, so that hardness thereof will not vary. Since the bonded magnet powder is obtained by grinding and heat-treating high-hardness alloy having improved magnetic properties obtained using rapid-quenching method such as melt spinning or strip casting, it is extremely difficult to reduce the hardness to a half of a typical one without deteriorating magnetic properties. The amount of spring back which may cause deterioration in magnetic properties is preferably adjusted on the side of the iron yoke mainly functioning as a back yoke rather than on the side of the bonded magnet in consideration of a motor output.

In other words, it is preferable that soft-magnetic alloy powder having higher hardness than the atomized iron powder is added to the atomized iron powder to averagely increase the amount of spring back without significantly degrading the soft-magnetic properties and compactibility of the iron yoke. As a powder added to the atomized iron powder, there may be used a pulverized powder of ferrosilicon, iron-based amorphous, nano-crystalline soft-magnetic material, stainless steel, cast iron or the like. The amount of high-hardness soft-magnetic alloy powder added to the soft-magnetic yoke part may be adjusted so that Young's modulus of the soft-magnetic yoke part after thermosetting-treatment is equal to 100% to 120% of that of the bonded magnet part. When the above powder is added to the soft-magnetic yoke part, however, the amount thereof is about 3% to about 30% by mass. A ratio of added high-hardness soft-magnetic powder (% by mass) is calculated by the following equation:

A ratio of high-hardness soft-magnetic powder (% by mass)=mass of pulverized powder/(mass of atomized iron powder+mass of pulverized powder)×100.

Thus, the third embodiment of the present invention provides a soft-magnetic yoke-integrated bonded magnet, in which a magnet powder containing a binding material and a soft-magnetic powder containing a binding material are integrally compression molded while engaging with each other at a joint face where both powders are in contact with each other, wherein the soft-magnetic powder contains a powder consisting of one or more materials selected from the group consisting of ferrosilicon, iron-based amorphous alloy, nano-crystalline soft-magnetic material, stainless steel and cast iron by 3% to 30% by mass in the atomized iron powder. The hardness of the powder to be added to the atomized iron powder is preferably not less than Hv300, more preferably not less than Hv600. The powder to be mixed preferably has a diameter less than or equal to that of the atomized iron powder so that the mixed powder does not become a starting point of a crack. The reason why the hardness Hv of the added powder is rendered to be not less than 300, more preferably not less than 600 is because the amount of the added powder for adjusting the amount of spring back is reduced as much as possible with respect to the atomized iron powder which is good in availability and excellent in soft-magnetic properties and compactibility. The higher the hardness of the added powder is, the greater the amount of spring back is, while the added amount is small. Furthermore, the higher soft-magnetic properties (i.e., magnetic permeability and saturation magnetic flux density) the added powder has, the longer the high soft-magnetic properties are maintained even after compression molding. Thus, a powder, particularly pulverized powder, such as ferrosilicon, iron-based amorphous, nano-crystalline soft-magnetic material, stainless steel or cast iron having high hardness and excellent in magnetic properties, is preferable for mixing with the atomized iron powder.

Both the bonded magnet and the soft-magnet yoke expand by approximately 0.3% after the thermosetting treatment with respect to the dimensions of the compact body after the compression molding. The amount of expansion of the bonded magnet and the soft-magnet yoke through the thermosetting-treatment vary depending mainly on the kind and the amount of the added binding material. If the difference is great between before and after the thermosetting treatment, the amount of spring back on the side of the iron yoke is preferably adjusted in consideration of the expansion coefficient after the thermosetting treatment.

As the high-hardness soft-magnetic alloy powder mixed with the atomized iron powder in the second embodiment of the present invention, a material having high hardness and electric resistance may be mixed therewith. In terms of high-hardness mixed powder, there may be obtained the same effect of spring-back adjustment as in the second embodiment of the present invention. If the mixed powder also possesses the property of high electric resistance, there may be obtained the effect that eddy current loss is lowered particularly at the time when the motor rotates at a high speed. As a material having high hardness and electric resistance, there may be raised Si, $SiO_2$, SiC, $Al_2O_3$, MgO and the like. Alternatively, iron based alloy powder containing Cr, Mo, V, W, Co and the like subjected to an insulating treatment may be added to the atomized iron powder. The mixing amount of the powder consisting of a material having high hardness and electric resistance is 3% to 30% by mass. The hardness Hv of the additive is preferably not less than 300, more preferably not less than 600. The powder preferably has a diameter less than or equal to the atomized iron powder, and is evenly dispersed in the atomized iron powder so that the mixed powder does not become a starting point of a crack.

Thus, the fourth embodiment of the present invention provides a soft-magnetic yoke-integrated bonded magnet, in which a magnet powder containing a binding material and a soft-magnetic powder containing a binding material are integrally compression molded while engaging with each other at a joint face where both powders are in contact with each other, wherein the soft-magnetic powder includes a powder consisting of one or more materials selected from the group consisting of Si, $SiO_2$, SiC, $Al_2O_3$ and MgO by 3% to 30% by mass in the atomized iron powder.

The fifth embodiment of the present invention provides a soft-magnetic yoke-integrated bonded magnet, in which a magnet powder containing binding material and a binding material-containing soft-magnetic powder are integrally compression molded while engaging with each other at a joint face where both powders are in contact with each other, wherein the soft-magnetic powder contains a powder consisting of one or more elements selected from the group consisting of Cr, Mo, V, W and Co subjected to an insulating treatment by 3% to 30% by mass in the atomized iron powder. The reason why the amount of the powder to be mixed is limited to 3% to 30% by mass is because Young's modulus of the soft-magnet yoke part after the thermosetting treatment is adjusted to 100% to 120% of that of the bonded magnet part.

When any of the iron yoke-integrated bonded magnet or the soft-magnetic yoke-integrated bonded magnet in the above embodiments is combined with a rotating shaft of a motor, a magnet rotator for a motor may be produced, which is high in strength safety also for applications for high speed rotation.

When the magnet rotator for a motor is combined with a stator having a field winding, a motor may be produced, which rotates according to a rotating magnetic field generated by the stator.

In the present invention, the magnet powder preferably has an average particle diameter of 50 μm to 200 μm. The soft-magnetic powder preferably has an average particle diameter of 1 μm to 100 μm. Since both powders have different particle diameters, the magnet powder and the soft-magnetic powder are easily engaged with each other so as to increase a joint strength between the bonded magnet part and the soft-magnetic part, allowing producing a rotator capable of decreasing a void or a crack. More preferably, the magnet powder has an average particle diameter of 80 μm to 150 μm, and the soft-magnetic powder has an average particle diameter of 5 μm to 50 μm.

The magnet powder is desirably an isotropy and/or anisotropy R—Fe—B magnet powder or a mixed powder of Sm—Fe—N magnet. If residual magnetic flux density Br is less than 0.4 T, such as a ferrite bonded magnet, it cannot provide a necessary and sufficient torque for a motor. For this reason, it is desirable to use a rare-earth bonded magnet having $Br \geqq 0.8$ T and coercive force $Hcj \geqq 600$ kA/m.

On the other hand, the soft-magnetic powder is desirably adjusted to have electric conductivity of not more than 20 kS/m, saturation magnetic flux density Bm not less than 1.4 T, and coercive force Hc not more than 800 A/m, by adding iron-based amorphous alloy powder, nano-crystalline soft-magnetic powder and the like to the atomized iron powder. An electric conductivity of not more than 20 kS/m enables reducing eddy current loss substantially equivalent to that in an insulating laminate such as silicon steel plate used as the soft-magnetic yoke in a conventional bonding method. A low saturation magnetic flux density Bm can not provide necessary and sufficient magnetic flux, and the yoke is required to be extremely increased in size. Particularly, in the case where a rare-earth bonded magnet having $Br \geqq 0.8$ T is used like the present invention, the above problem arises. Excessively high coercive force Hc significantly reduces hysteresis loss at the time of rotating of a motor, so that a motor efficiency is substantially lowered.

There has been developed a variety of techniques for integrally molding a magnet with a soft-magnetic yoke in views of productivity and assembly accuracy. Since an insert molding (see Patent Document 1) requires a raw material to have a high fluidity from its production method, a large amount of resin needs to be mixed with a magnet material and a soft-magnetic material. For this reason, the percentage by mass of the magnet material and the soft-magnetic material is approximately 60%, which is advantageous in weight, but is low in magnetic properties. On the other hand, the compression molding in the present invention is capable of increasing the percentage by mass of the magnet material and the soft-magnetic material to approximately 98%, which has an advantage because higher magnetic properties may be obtained.

The soft-magnetic powder is preferably coated with insulating film. Alternately, rare-earth magnet powder is preferably coated with insulating film. Coating with insulating film increases electric resistance to reduce eddy current loss at the time of rotating of the motor.

As a raw material for molding a magnet rotator in which the bonded magnet is integrally molded with the soft-magnetic yoke, a resin binder (or, a binding material) is added to a magnet powder and a soft-magnetic powder. The binding material desirably contains thermosetting resin by 1% to 5% by mass for a magnet powder compound and by 0.1% to 3% by mass for a soft-magnetic powder compound. The binding material is preferably thermosetting resin. For example, epoxy resin, phenol resin, urea resin, melamine resin, polyester resin or the like may be suitably used. The amount of the binding material in the magnet powder is preferably 0.1% to 5% by mass, more preferably 1.0% to 4% by mass. The amount of the binding material in the soft-magnetic powder is preferably 0.1% to 3% by mass, more preferably 0.5% to 2% by mass. An excessively small amount of the binding material significantly lowers mechanical strength. An excessively large amount of the binding material significantly lowers magnetic properties.

The soft-magnetic powder and the binding material or the magnet powder (particularly, rare-earth magnet powder) and the binding material are mixed to form a compound. The compound may include an oxidation inhibitor and a lubricant. The oxidation inhibitor inhibits the magnet powder from oxidizing to prevent deterioration of magnetic properties of the magnet. Furthermore, the oxidation inhibitor contributes to improve thermal stability at the time of blending and compacting the compound so that a good compactibility is maintained with a small amount of the binding material added thereto. There may be used known oxidation inhibitors such as chelating agent, which forms chelate compounds with metal ions, particularly with Fe components, for example, tocopherol, amine compound, amino acid compound, nitrocarboxylic acid, hydrazine compound, cyan compound, sulfide or the like.

The lubricant improves fluidity at the time of blending and compacting the compound, so that the equivalent characteristics may be obtained with a small amount of the binding material added thereto. There may be used known lubricants such as, stearic acid or metal salt thereof, fatty acid, silicone oil, various waxes or fatty acid.

In addition to the above, various additives such as stabilizer and molding auxiliary may be added thereto. The compound is mixed using a mixer or an agitator.

Figure 5:
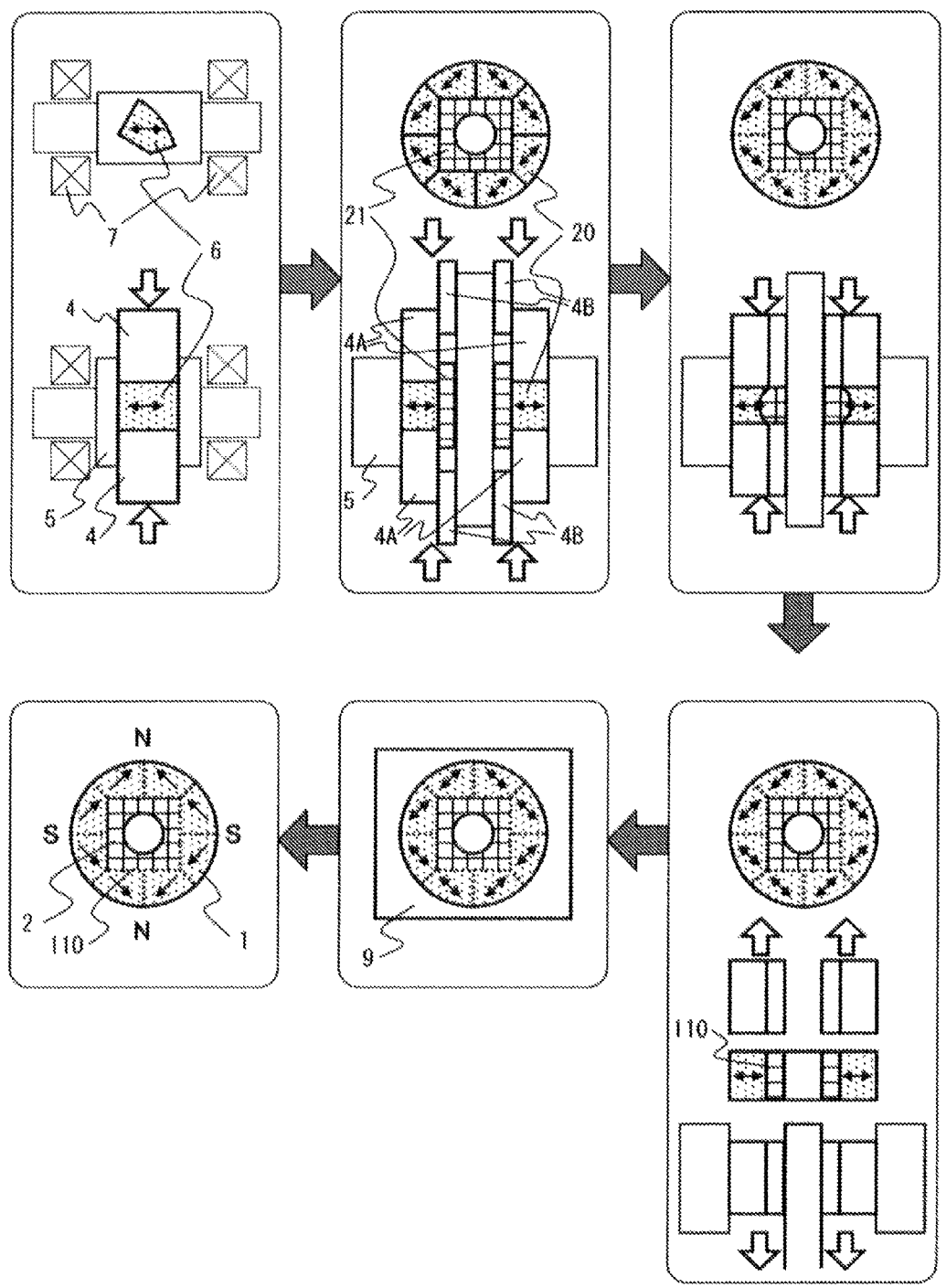
FIG. 5 is a schematic diagram illustrating a production method of integrally molding an anisotropic bonded magnet and an iron yoke according to another example of the present invention, and the diagram also illustrating a top view (upper figure) and a side view (lower figure) of pre-compacting for the magnet, pre-compacting assembly, integral molding, decompression, thermosetting and magnetization, in the order indicated by arrows.

Means for integrally molding the bonded magnet and the soft-magnetic yoke is described below in detail with reference to FIG. 5. A compression molding device dedicated to pre-compacting for a magnet is filled with a magnet powder compound 6 mainly consisting of a binding material and magnet powder with an average particle diameter of 50 μm to 200 μm to perform pre-compacting under a pressure of 200 MPa to 400 MPa. If the bonded magnet is anisotropic, the pre-compacting is performed while applying a magnetic field from an electromagnet 7 or the like. A binding material and an atomized iron powder compound 8 with an average particle diameter of 1 μm to 100 μm are also pre-compacted with the compression molding device dedicated to pre-compacting under a pressure of 200 MPa to 400 MPa. The reason why a molding pressure is lowered at the time of the pre-compacting is because a joint strength between a magnet powder 6 and a soft-magnetic powder 8 is increased at the time of the compacting. The amount of spring back of the atomized iron powder compound 8 is leveled with that of the magnet powder 6 by increasing the ratio of powder supplied or mixing additives as described above.

A plurality of pre-compact bodies 20 of bonded magnets and a pre-compact body 21 of a soft-magnetic yoke in consideration of the amount of spring back are combined and placed again in a cavity and integrally molded (without magnetic field) under a molding pressure of 600 MPa to 1000 MPa higher than that at the time of the pre-compacting. Since powders on the surface of the pre-compact body are too low in density to adhere, the interface between the magnet powder 6 and the soft-magnetic powder 8 is brought into close contact with each other while having irregularity according to the particle diameters of powders to join the magnet molding 20 to the soft-magnetic molding 21. For this reason, the larger the irregularity on the interface is, the higher the mechanical joining strength is. A binding material and adhesive may be coated in advance on a joint face 110 of the pre-compact body. The binding material and the adhesive are melt through the thermosetting treatment performed after the compacting (in a heat curing furnace 9) and permeate through the bonded magnet part 1 and the soft-magnetic yoke part 2, to increase a joint force on the joint face.

It is difficult to obtain stable adhesion strength by a conventional jointing method using an adhesive because the thickness of an adhesive layer is dispersed and adhesion strength is varied depending on status of an adhesion surface. Even if an adhesive with an adhesion strength of not less than 20 MPa is used, an adhesion area may be ensured as small as about ⅓, and an adhesion strength of substantially not more than 5 MPa may be obtained on an average. On the other hand, in the present invention, the pressure between the bonded magnet part and the soft-magnetic part is ensured throughout the joint face 110, and a shearing stress always stably reaches not less than 10 MPa and further not less than 15 MPa. The supply of exciting current to a stator coil generates a rotation torque at a rotator. At this point, stress in the tangential direction with respect to the rotation direction is caused at the rotator, while a shearing stress is applied to the joint interface between the bonded magnet part and the soft-magnetic yoke part. As the rotation speed increases, tensile stress is also applied to the joint interface. The joint interface formed by the present invention has a high strength almost equivalent to the shearing stress and the tensile stress. If the present invention is applied to a motor rotator, for example, a high shearing stress is probably applied to the joint interface, so that a shearing strength at the joint interface is taken as an index of a joint strength in the examples described later.

Figure 6A:
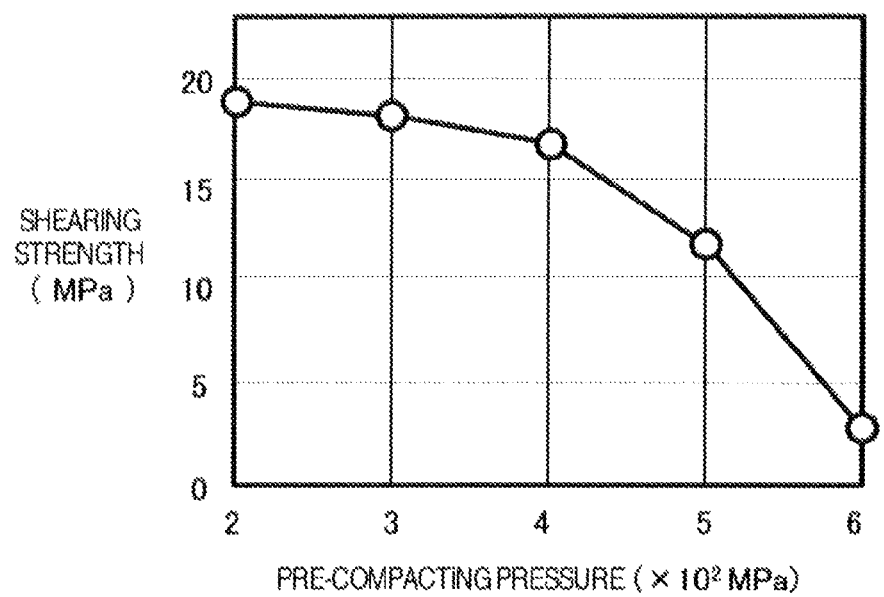
FIG. 6A is a chart illustrating a pre-compacting pressure (abscissa) of an isotropic bonded magnet according to the present invention and a shearing strength (ordinate) at a joint face between the isotropic bonded magnet and a soft-magnetic yoke after the isotropic bonded magnet has integrally molded with a soft-magnetic powder.

FIG. 6A shows a correlation between the pre-compacting pressure and the shearing strength at the joint interface in the case where the pre-compacting pressure of the isotropic bonded magnet powder is varied from 200 MPa to 600 MPa and the compacting pressure is taken as 600 MPa after the isotropic bonded magnet powder is combined with the soft-magnetic powder under each condition. As is seen from FIG. 6A, the lower the pre-compacting pressure of the isotropic bonded magnet is, the higher is the shearing strength at the joint face 110 obtained after the isotropic bonded magnet powder is combined and integrally molded with the soft-magnetic powder. The pre-compact body can not keep its shape any more under the pre-compacting pressure of not more than 200 MPa, and productivity is substantially decreased. Since the residual magnetic flux density of the magnet part is isotropic, it is not correlated with the pre-compacting pressure. As the material powder, there was used the isotropic bonded magnet powder of NdFeB bonded magnet powder with an average particle diameter approximately 100 μm added with a binder by 3% by mass. As the soft-magnetic powder, was used an atomized iron powder with an average particle diameter approximately 30 μm added with a iron-based amorphous alloy powder with a particle diameter of approximately 30 μm and a Vickers hardness Hv of 700 by 11% by mass.

Figure 6B:
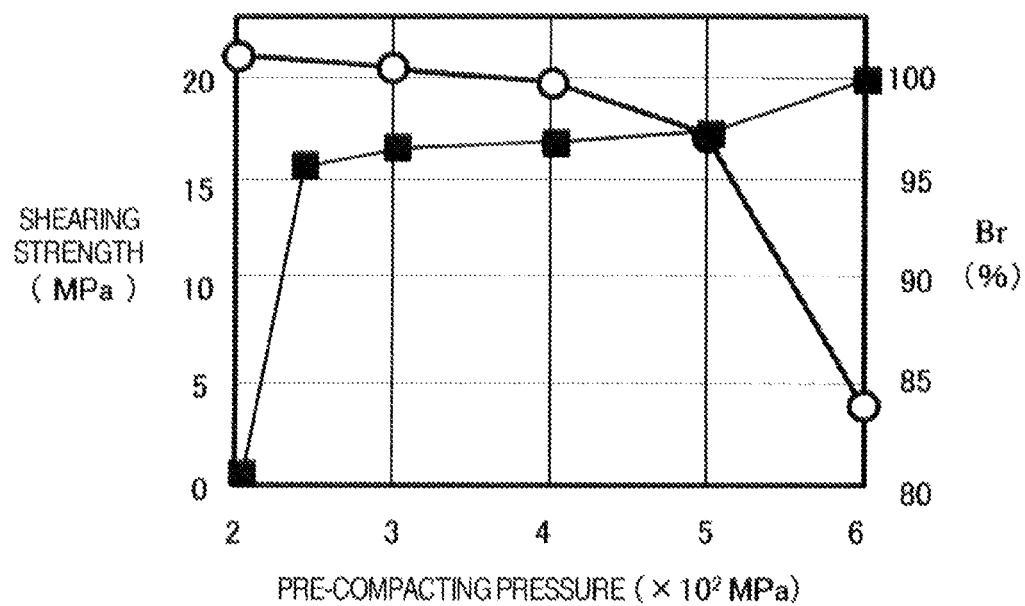
FIG. 6B is a chart illustrating an pre-compacting pressure (abscissa) of an anisotropic bonded magnet according to the present invention and a shearing strength after the anisotropic bonded magnet has integrally molded with an soft-magnetic powder, where blank circles indicate the shearing strength (left ordinate) at the joint face between the anisotropic bonded magnet and the soft-magnetic yoke and solid squares indicate the residual magnetic flux density Br (left ordinate) of the anisotropic bonded magnet.

FIG. 6B shows a correlation of the pre-compacting pressure with the shearing strength at the joint interface and the residual magnetic flux density of the magnet part, in the case where the pre-compacting pressure of the anisotropic bonded magnet powder is varied from 200 MPa to 600 MPa and the compacting pressure is taken as 600 MPa after the anisotropic bonded magnet powder is combined with the soft-magnetic powder under each condition. As illustrated in FIG. 5, since magnetic field is not applied at the integral molding process, the lower the pre-compacting pressure is, the more easily the orientation of the magnet formed in the pre-compacting is disturbed at the time of the compacting, so that the residual magnetic flux density is lowered. For this reason, for the anisotropic bonded magnet, the pre-compacting pressure is preferably 250 MPa to 500 MPa and more preferably about 300 MPa to about 400 MPa in terms of compatibility between the magnetic properties of the magnet and the joint force, when subjected to pre-compacting process under magnetic field and the compacting process without magnetic field. As the material powder, there was used the anisotropic bonded magnet powder of NdFeB bonded magnet powder having an average particle diameter approximately 80 μm added with a binder by 3% by mass. As the soft-magnetic powder, was used an atomized iron powder having an average particle diameter approximately 30 μm added with iron-based amorphous alloy powder having a particle diameter of approximately 30 μm and a Vickers hardness Hv of 700 by 11% by mass.

Figure 7:
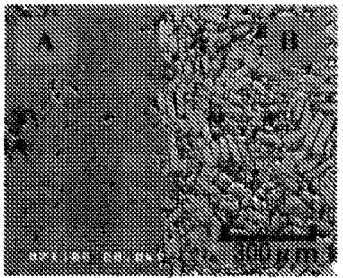
FIG. 7 shows photographs of joint faces between a magnet and a soft-magnetic powder after integral molding, with pre-compacting pressures varied according to the present invention, where arrows indicate joint faces.
Figure 7:
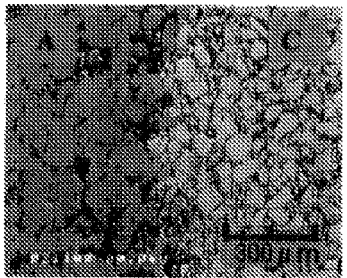
Figure 7:
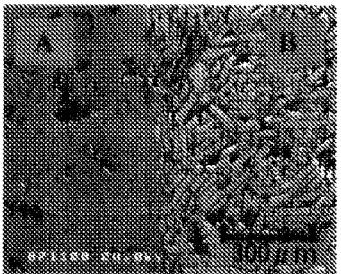
Figure 7:
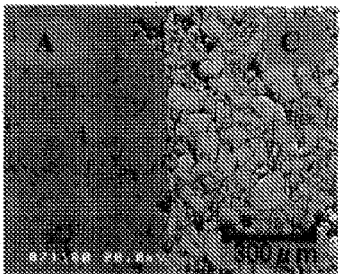
Figure 7:
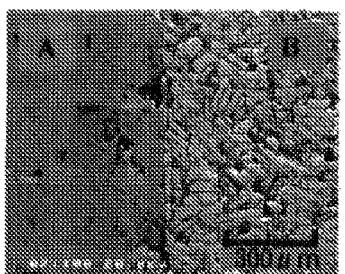
Figure 7:
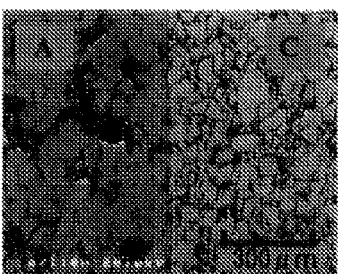
Figure 8:
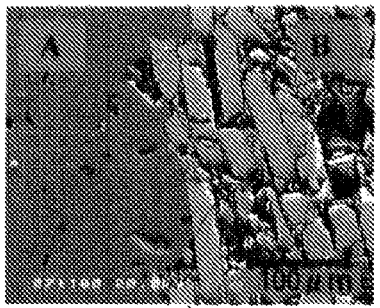
FIG. 8 shows enlarged photographs of FIG. 6.
Figure 8:
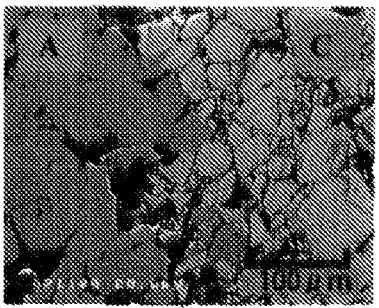
Figure 8:
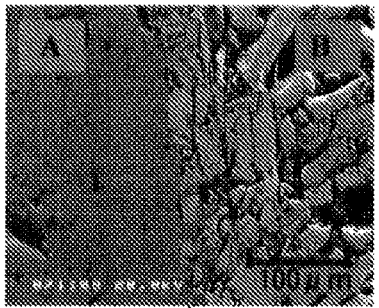
Figure 8:
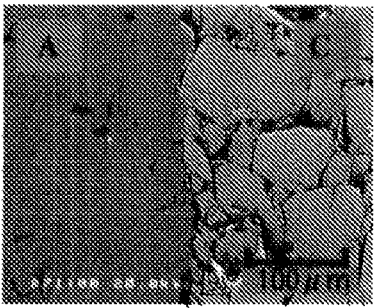
Figure 8:
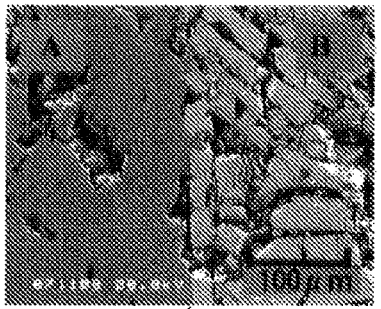
Figure 8:
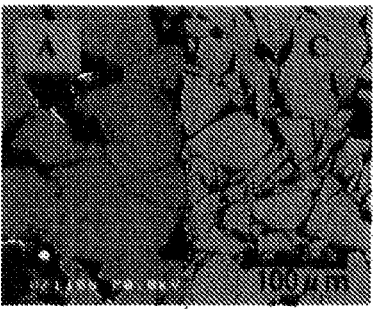
Figure 9:
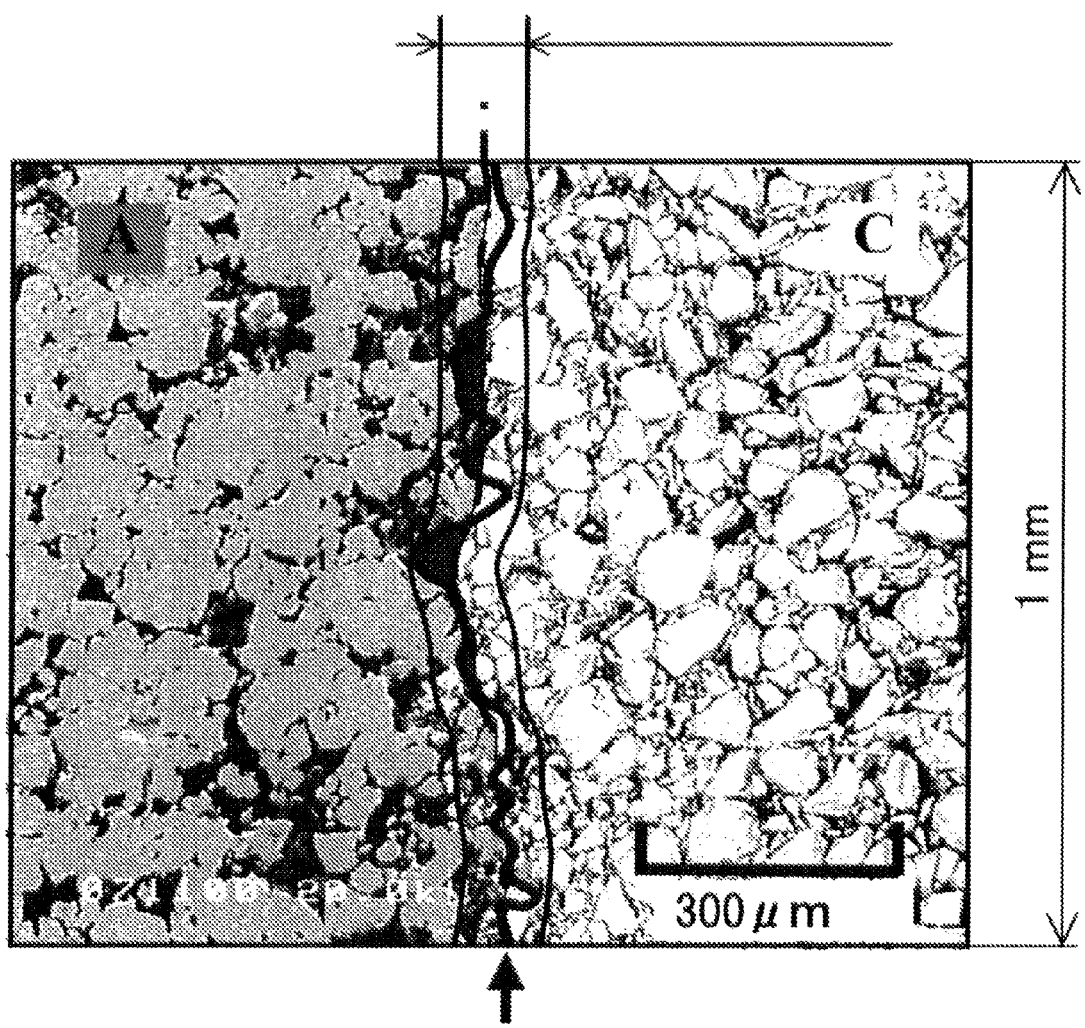
FIG. 9 shows photographs for describing a definition of an amount of irregularity at a joint face and the thick arrow indicates the joint face.
Figure 10A:
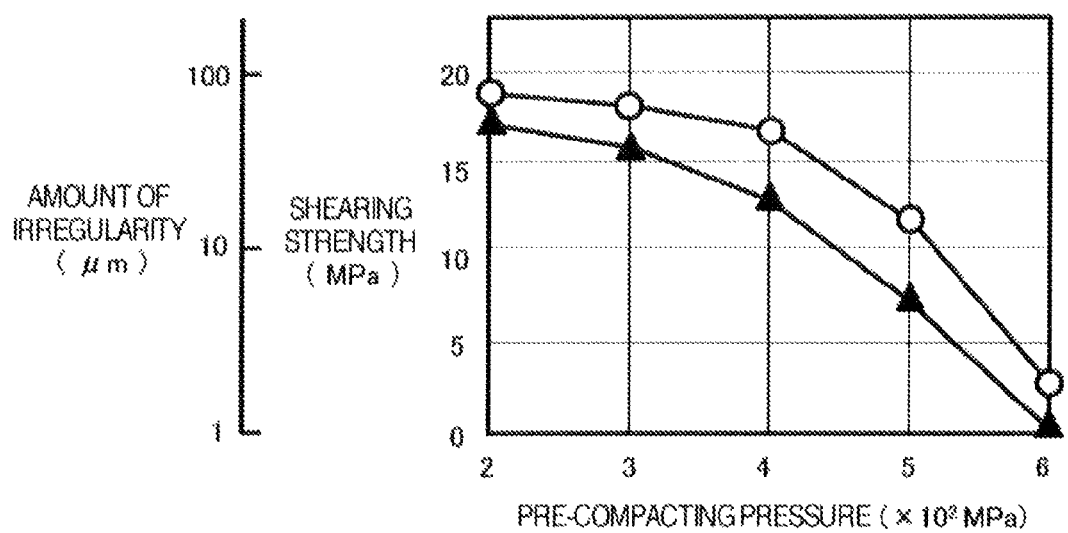
FIG. 10A is a chart illustrating a pre-compacting pressure (abscissa) of an isotropic bonded magnet according to the present invention, a shearing strength (ordinate) and an amount of irregularity (ordinate) on a joint face between the isotropic bonded magnet and a soft-magnetic powder after integral molding, where blank circles indicate the shearing strength at the joint face between the isotropic bonded magnet and the soft-magnetic yoke and solid triangles indicate the amount of irregularity on the joint face.
Figure 10B:
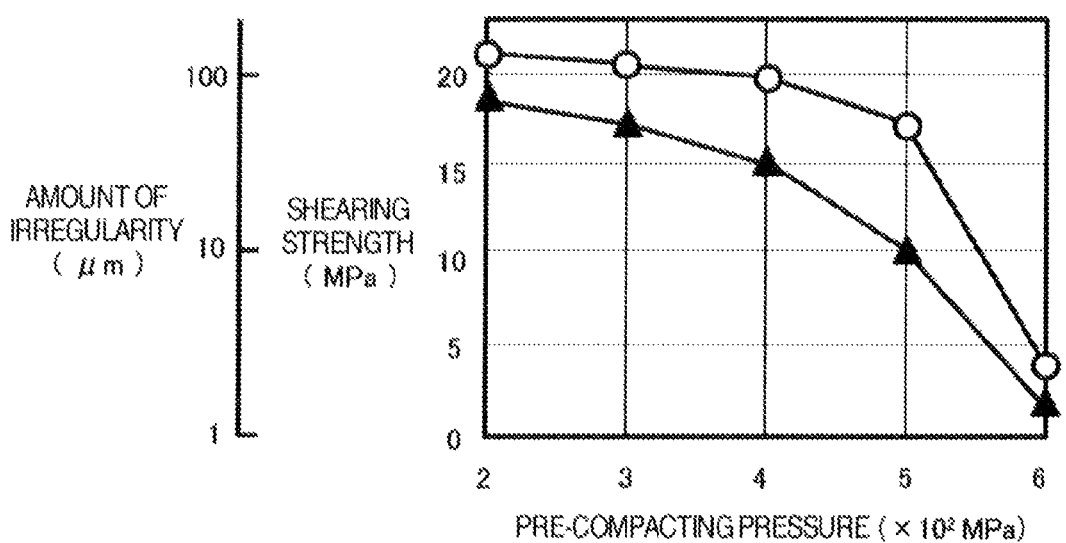
FIG. 10B is a chart illustrating a pre-compacting pressure (abscissa) of an anisotropic bonded magnet according to the present invention, a shearing strength (ordinate) and an amount of irregularity (ordinate) on a joint face between the anisotropic bonded magnet and a soft-magnetic powder after integral molding, where blank circles indicate the shearing strength at the joint face and solid triangles indicate the amount of irregularity on the joint face.
Figure 11A:
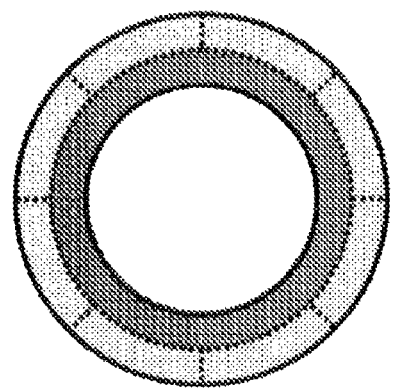
FIG. 11A is a schematic cross section of a permanent magnet rotator according to another example of the present invention, where a light-tinted area indicates a cross section (X) of a bonded magnet, a dark-tinted area indicates a cross section (Y) of a soft-magnetic yoke part and X=Y.
Figure 11B:
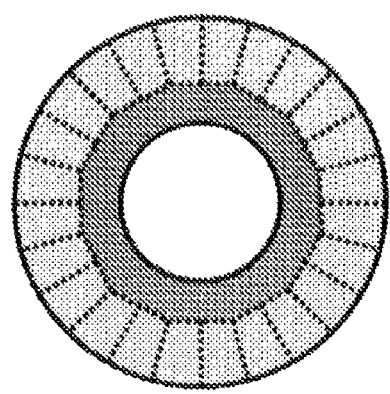
FIG. 11B is a schematic cross section of a permanent magnet rotator according to another example of the present invention, where a light-tinted area indicates a cross section (X) of a bonded magnet, a dark-tinted area indicates a cross section (Y) of a soft-magnetic yoke part and X=Y.
Figure 11C:
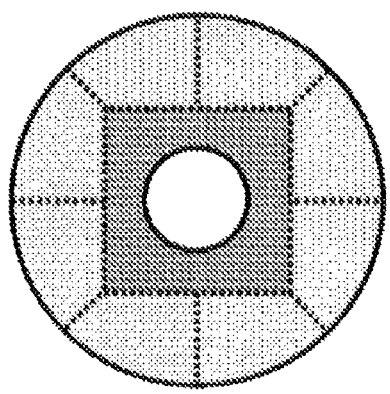
FIG. 11C is a schematic cross section of a permanent magnet rotator according to another example of the present invention, where a light-tinted area indicates a cross section (X) of a bonded magnet, a dark-tinted area indicates a cross section (Y) of a soft-magnetic yoke part and X=Y.
Figure 11D:
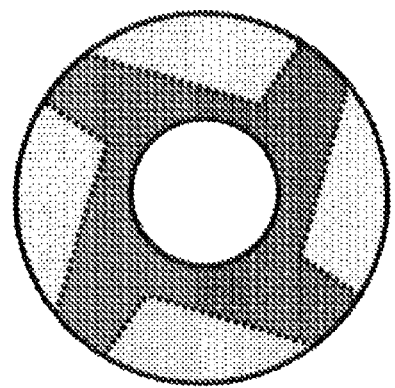
FIG. 11D is a schematic cross section of a permanent magnet rotator according to another example of the present invention, where a light-tinted area indicates a cross section (X) of a bonded magnet, a dark-tinted area indicates a cross section (Y) of a soft-magnetic yoke part and X=Y.
Figure 11E:
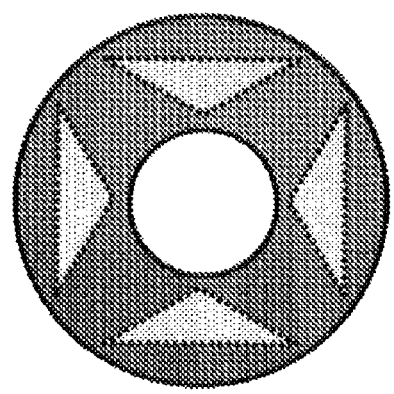
FIG. 11E is a schematic cross section of a permanent magnet rotator according to another example of the present invention, where a light-tinted area indicates a cross section (X) of a bonded magnet, a dark-tinted area indicates a cross section (Y) of a soft-magnetic yoke part and X=Y.
Figure 11F:
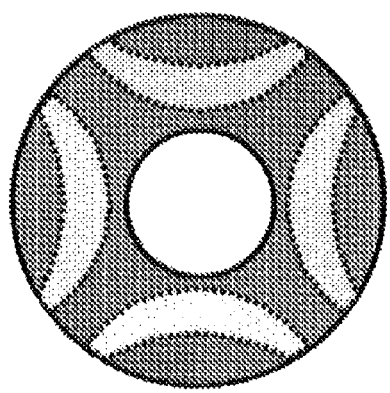
FIG. 11F is a schematic cross section of a permanent magnet rotator according to another example of the present invention, where a light-tinted area indicates a cross section (X) of a bonded magnet, a dark-tinted area indicates a cross section (Y) of a soft-magnetic yoke part and X=Y.

FIGS. 7 and 8 are photographs of the joint face at cross section in the pressure direction of the integral compact body obtained after compacting while the pre-compacting pressure is varied. FIG. 9 is an enlarged photograph of the joint face in FIG. 8. The upper and lower direction in the photo corresponds to the pressure direction at the time of compacting. As illustrated in FIGS. 7 and 8, in both the isotropic and the anisotropic bonded magnets, the lower the pre-compacting pressure is, the more is the amount of irregularity on the joint interface. In the case where the pre-compacting pressure is equal to the compacting pressure, the irregularity on the joint interface is hardly observed. FIG. 10A shows a correlation of the pre-compacting pressure of the isotropic bonded magnet with the shearing strength and the amount of irregularity on the joint face. FIG. 10B shows a correlation of the pre-compacting pressure of the anisotropic bonded magnet with the shearing strength and the amount of irregularity on the joint face. In the present invention, as shown in FIGS. 7 and 8, the magnet powder is engaged with the soft-magnetic powder in the vicinity of the interface with the amount of irregularity of about 50 μm to about 100 μm to obtain a strong joint force of not less than 15 MPa.

The amount of irregularity on the joint face between the magnet powder and the soft-magnetic powder is described below with reference to FIG. 9. One curved line is drawn along places where the magnet powder meets the soft-magnetic powder in the cross-sectional photograph (a thick line in the figure). This line is a joint face. Another curved line is drawn along the substantial center of the irregularity of the joint face. This curved line is drawn so that an area surrounded by the curved line and the joint face becomes equal between left and right portions. This curved line is taken as a center line (an dark-tinted area in the figure shows an irregularity area (c) on the side of the soft-magnetic yoke and a light-tinted area shows an irregularity area (a) on the side of the bonded magnet, and "a" is equal to "c"). The center line is displaced in parallel to a position where the center line contacts the peak of the joint face. Similarly to the above, the center line is displaced in parallel also in the opposite direction. The distance between the two lines drawn by parallel displacement represents the amount of irregularity. The work is conducted in a visual field along the joint face with a length of 1 mm.

Thus, a high joint force may be obtained between the bonded magnet part and the soft-magnetic yoke part, so that a reinforcing protective ring can be eliminated which is indispensable for a conventional adhesion or integral molding systems (see Patent Documents 1 and 2). Furthermore, in the present invention, a high pressure force may be obtained throughout the joint face 110 between the magnet and the soft-magnetic yoke, so that neither the magnet part is limited to a ring shape, nor the soft-magnetic yoke is held only with the internal pressure of a ring magnet (see Patent Documents 3 and 4). The compression molding under a pressure higher than the pre-compacting pressure provides a high joint force even on the joint face 100 between the bond magnet parts themselves, as is the case with the joint face 110 between the magnet and the soft-magnetic yoke.

According to the present invention, since a magnet may be oriented unit by unit under a sufficient magnetic field during a pre-compacting process, an easy and stable orientation and magnetization is ensured irrespective of the number of poles and dimensions of the magnet. That is to say, as a method of producing a component for a magnetic circuit including an anisotropic bonded magnet part and a soft-magnetic yoke part, there may be adopted a producing method in which the anisotropic bonded magnet part is pre-compacted under magnetic field using a magnet powder compound mainly comprising a binding material and a magnet powder having an average particle diameter of 50 μm to 200 μm; thereafter, the anisotropic bonded magnet part is compacted without magnetic field to be integrated with a soft-magnetic powder compound mainly comprising a soft-magnetic powder with an average particle diameter of 1 μm to 100 μm; and it is thermoset. A super-hard material which places more importance on mechanical strength than on magnetic properties is used for a mold for the compacting, and the mold needs to be formed with a certain thickness or more, so that the mold may withstand a pressure of 500 MPa to 1000 MPa. For this reason, it becomes difficult to convey the magnetic field generated in the electromagnet to the magnet part of the compact body without waste. However, under a pre-compacting pressure of approximately 300 MPa, a steel material having high saturation magnetic flux density and relative magnetic permeability may be used as a mold material placing importance on magnetic properties, and it may be thinned. Thus, a magnetic field having a uniform orientation in distribution and high strength may be generated in the magnet part of the compact body. For example, when a radial anisotropic ring magnet is oriented, the magnet is oriented in a mold for a pre-compacting, and a magnet having high orientation and small magnetic dispersion is obtained.

In terms of production facilities, a press machine of an approximately 300 MPa for pre-compacting is more compact than a press machine for compacting and a material for the press machine may be used placing more importance on magnetic properties.

In the case where a compression molding is performed under a pressure of 500 MPa to 1000 MPa at the final production step, for example, the R—Fe—B bonded magnet part is 5.5 to 6.5 Mg/m$^3$ in density, the R—Fe—N bonded magnet part is 5.3 to 6.2 Mg/m$^3$ in density and the bonded soft-magnetic part of Fe powder is 6.0 to 6.8 Mg/m$^3$ in density.

A thermosetting treatment is conducted at a temperature of not higher than 250° C. after the integral molding. In addition, a surface treatment, such as epoxy resin coating, is conducted if required. Then, a rotary shaft is pressed into and bonded to the molding and finally the magnetic pole part is magnetized to produce a magnet rotator.

EXAMPLES

For a first embodiment of the present invention, rotators with various-shaped magnets as typified by FIGS. 11A to 11F were produced. A reference value is defined as an amount of powder supplied per unit area, with which the thicknesses in the press direction of compact bodies of the bonded magnet part and the iron yoke part are leveled with each other when they were separately compression-molded. Only the amount of atomized-iron powder supplied for forming the iron-yoke-part was increased with respect to the reference value. As a result, under the condition that the cross sections of the pressured faces of the bonded magnet part and the iron yoke part are nearly equal to each other in the rotator having the structure shown in FIG. 1C, no cracks was generated in the iron yoke when the amount of atomized-iron powder supplied per unit area was within the range of not less than the reference value and not more than 1.02 times of the reference value. The respective joint strengths after thermosetting treatment were compared and the highest shearing strength of 19.6 MPa was obtained when the amount of the atomized iron powder supplied per unit area is 1.01 times as much as the reference value. Hereinafter, a ratio of the cross section of the iron yoke part to that of the magnet part is referred to as the cross-section ratio of the iron yoke. In addition, hereinafter, a ratio of the amount of iron powder supplied per unit area, by which the highest joint strength may be obtained, in relation to the reference value is referred to as optimum powder supply ratio of the iron yoke. As a material powder of the magnet powder, NdFeB anisotropic bonded magnet powder having an average particle diameter of approximately 80 μm added with a binder by 3% by mass was used. As the soft-magnetic powder, an atomized iron powder having an average particle diameter of approximately 30 μm was used. The pre-compacting pressure of the bonded magnet powder and the atomized iron powder was 300 MPa respectively. The compacting pressure at the time of integral molding was 800 MPa. The thermosetting treatment was conducted after the integral molding at a temperature of 200° C.

Figure 12:
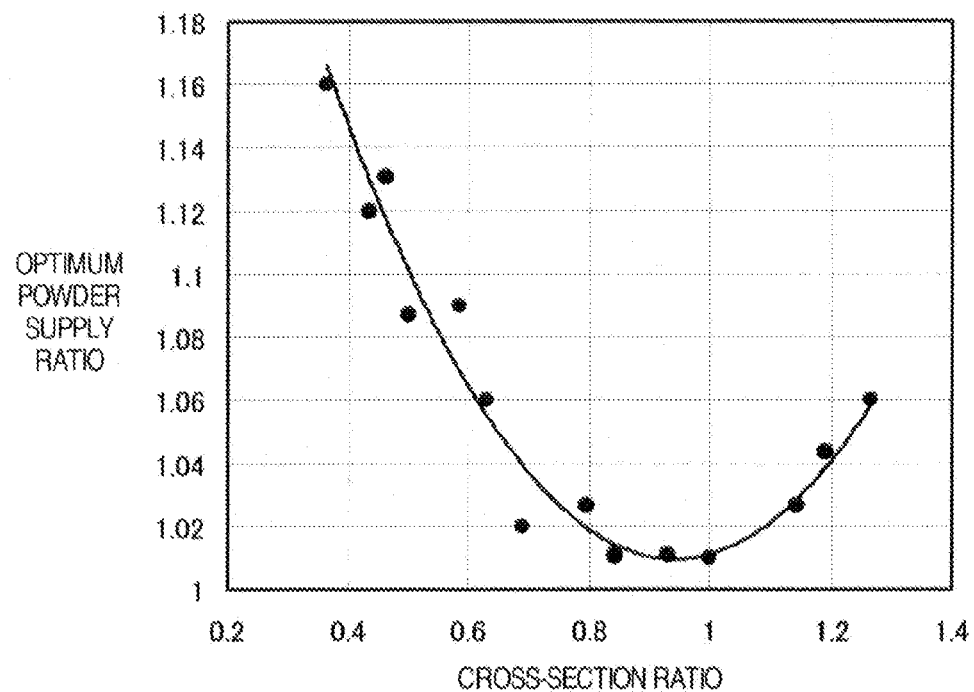
FIG. 12 is a chart illustrating a correlation between a cross-section ratio (abscissa) of an iron yoke part to a magnet part according to the present invention and the optimum powder supply ratio (ordinate) of the iron yoke part.

A correlation between the cross-section ratio and the optimum powder supply ratio of the iron yoke was obtained in the rotators having various-shaped magnets as typified in FIGS. 11A to 11F. When the magnet part and the iron yoke part are composed of a plurality of parts, respective cross sections and the amount of powder supplied are totaled. Resultantly, as illustrated in FIG. 12, it was found that the optimum powder supply ratio of the iron yoke part is proportional to the second power of the cross-section ratio thereof, as far as the lower limit of the cross-section ratio is about one. Under the optimum powder supply ratio, no crack was generated in the vicinity of the joint face between the bonded magnet and the iron yoke and a joint strength was as high as about 20 MPa.

Figure 13:
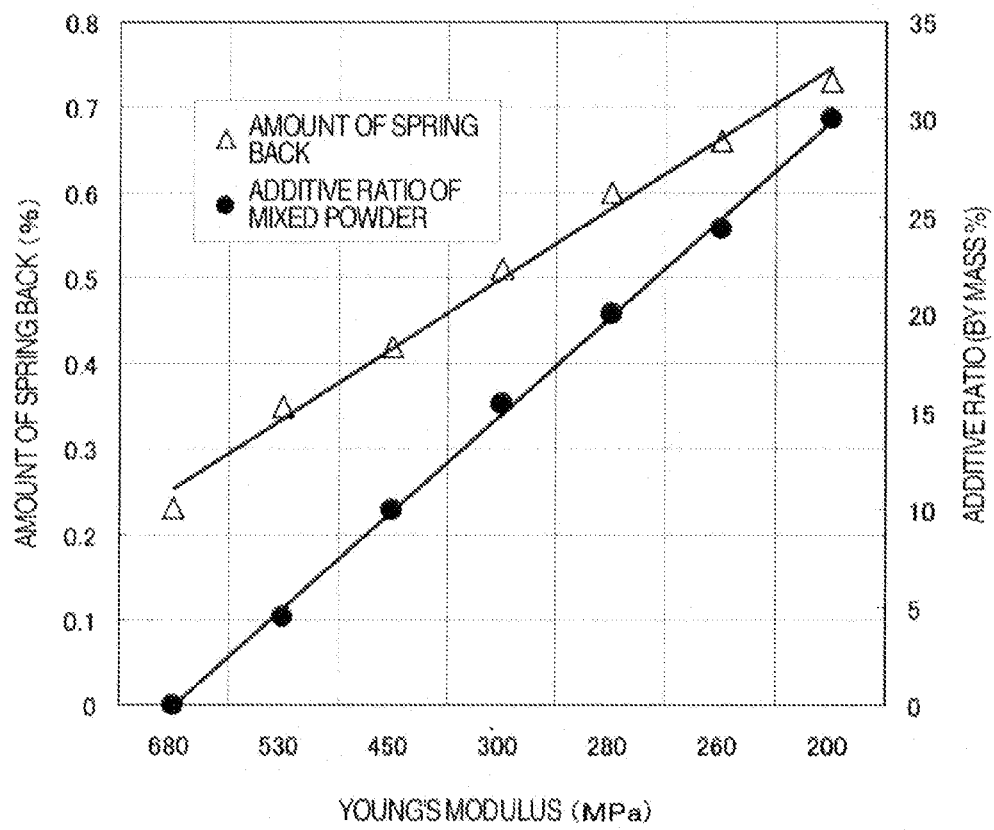
FIG. 13 is a chart illustrating a correlation among Young's modulus (abscissa) of an compact after thermosetting treatment, an amount of spring back (left ordinate) of the compact after the thermosetting treatment, and an additive rate (right ordinate) of an iron-based amorphous alloy powder according to the present invention.
Figure 14:
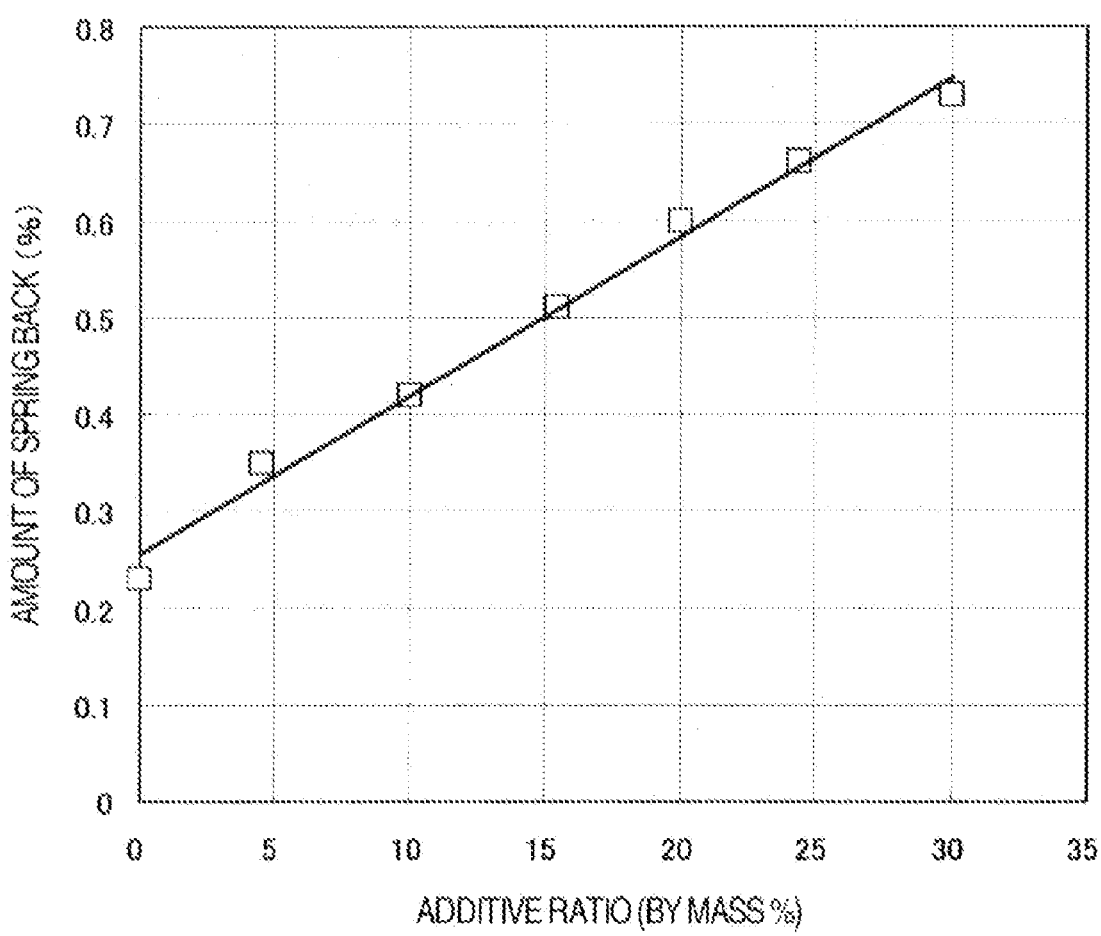
FIG. 14 is a chart illustrating a correlation between an additive rate (abscissa) of an iron-based amorphous alloy powder and an amount of spring back (ordinate) of a compact after thermosetting treatment according to the present invention.

For the second embodiment of the present invention, a soft-magnetic alloy powder having high hardness was added to the atomized iron powder to adjust the amount of spring back without significantly degrading the soft-magnetic properties and compression moldability of the iron yoke. Iron-based amorphous alloy, as the hard soft-magnetic alloy powder, was ground to a powder having a particle diameter of not more than 50 μm (a hardness Hv of 700 and a volume average particle diameter of 30 μm), and was added to the atomized iron powder (a hardness Hv of 100 and a volume average particle diameter of 30 μm) in increments of 5% up to 30% by mass. A resin binder was mixed with respective atomized iron powders by 1% by mass to produce compounds. Spring back of each compound immediately after the compression molding was measured in such a manner that a specimen having a diameter of 30 mm and a thickness of 20 mm was compacted under a pressure of as high as 800 MPa, then subjected to thermosetting treatment at a temperature of 200° C., and the diameter of the compact body in relation to the mold die was calculated. Resultantly, as illustrated in FIG. 13, Young's modulus of the compact body after the thermosetting treatment was directly proportional to both the amount of the spring back and the additive ratio of the iron-based amorphous alloy powder. In other words, as illustrated in FIG. 14, it was found that the additive ratio of the iron-based amorphous alloy powder was directly proportional to the amount of spring back of the compact body of the atomized iron powder, to which the iron-based amorphous alloy powder was added, after the thermosetting treatment. That is to say, for example, when the amount of spring back of the bonded magnet is 0.6%, the iron-based amorphous alloy powder is added into the atomized iron powder by 20% by mass and thus the amounts of spring back are leveled, thereby no cracks are generated after the integral molding even unless the amount of powder supplied is adjusted.

The invention claimed is:

1. An iron yoke-integrated bonded magnet in which a magnet powder containing a binding material and an atomized iron powder containing a binding material are integrally compression molded in a state both powders engages with each other at a joint face where both powders are in contact with each other, wherein
    an iron yoke is greater by 1% to 20% by mass than a reference value, the reference value being defined such that the iron yoke part and the bonded magnet part are leveled with each other in their thicknesses in the pressurized direction in the case where the iron yoke part and the bonded magnet part were separately compression molded.

2. A soft-magnetic yoke-integrated bonded magnet in which a magnet powder containing a binding material and a soft-magnetic powder containing a binding material are integrally compression molded in a state both powders are engage with each other at a joint face where both powders are in contact with each other, wherein
    Young's modulus of a soft-magnetic yoke part is 100% to 120% of that of a bonded magnet part.

3. The soft-magnetic yoke-integrated bonded magnet according to claim 2, wherein
    the soft-magnetic yoke is larger by not more than 10% by mass than a reference value, the reference value being defined such that the soft-magnetic yoke part and the bonded magnet part are leveled with each other in their thicknesses in the pressurized direction in the case where the iron yoke part and the bonded magnet part were separately compression molded.

4. The soft-magnetic yoke-integrated bonded magnet according to claim 2, wherein
    the soft-magnetic powder comprises: an atomized iron powder; and a powder consisting of one or more of materials selected from the group consisting of ferrosilicon, iron-based amorphous alloy, nano-crystalline soft-magnetic material, stainless steel or cast iron by 3% to 30% by mass.

5. The soft-magnetic yoke-integrated bonded magnet according to claim 2, wherein
    the soft-magnetic powder comprises: an atomized iron powder; and a powder consisting of one or more materials selected from the group consisting of Si, $SiO_2$, SiC, $Al_2O_3$ and MgO by 3% to 30% by mass.

6. The soft-magnetic yoke-integrated bonded magnet according to claim 2, wherein
    the soft-magnetic powder comprises: an atomized iron powder; and an iron based alloy powder, by 3% to 30% by mass, containing one or more elements selected from the group consisting of Cr, Mo, V, W and Co, the iron based alloy powder being subjected to an insulating treatment.

7. A magnet rotator for a motor comprising the soft-magnetic yoke-integrated bonded magnet according to claim 2.

8. A motor comprising a stator with a field winding and a rotor rotating according to rotating magnetic field generated by the stator, wherein the rotor is a magnet rotator for a motor according to claim 7.

* * * * *